United States Patent [19]
Taki et al.

[11] Patent Number: 5,554,451
[45] Date of Patent: Sep. 10, 1996

[54] OPTICAL DATA RECORDING MEDIUM

[75] Inventors: Kazunari Taki, Nagoya; Yumiko Ohashi, Hashima; Takuya Hamaguchi, Nagoya; Hideo Maruyama, Kuwana; Riki Matsuda, Nagoya, all of Japan

[73] Assignee: Brother Kogyo Kabushiki Kaisha, Nagoya, Japan

[21] Appl. No.: 952,647

[22] Filed: Sep. 28, 1992

[30] Foreign Application Priority Data

Sep. 27, 1991 [JP] Japan .................................. 3-249455
Sep. 27, 1991 [JP] Japan .................................. 3-249456
Nov. 14, 1991 [JP] Japan .................................. 3-299032

[51] Int. Cl.$^6$ .................................................. G11B 5/66
[52] U.S. Cl. .......................... 428/694 ML; 428/694 RL; 428/694 DE; 428/900; 369/13; 369/272; 369/275.1; 365/122
[58] Field of Search ................... 369/13, 272, 275.1; 365/122; 428/694 RL, 694 DE, 694 ML, 900

[56] References Cited

U.S. PATENT DOCUMENTS

| | | | |
|---|---|---|---|
| 4,771,415 | 9/1988 | Taki | 369/112 |
| 4,807,204 | 2/1989 | Mizutani et al. | 369/13 |
| 4,839,226 | 6/1989 | Sawada et al. | 428/336 |
| 4,922,454 | 5/1990 | Taki | 365/122 |
| 5,089,358 | 2/1992 | Taki et al. | 369/275.4 |
| 5,095,478 | 3/1992 | Taki et al. | 369/275.4 |

*Primary Examiner*—Leszek Kiliman
*Attorney, Agent, or Firm*—Oliff & Berridge

[57] ABSTRACT

An optical data recording medium of the present invention includes: a substrate; a reflective material layer formed of light-reflective material, the reflective material layer being provided over the substrate; and an optical data recording layer for optically recording data therein and for optically reproducing the data therefrom, the optical data recording layer being formed over the reflective material layer. The reflective material layer is patterned so that the light-reflective material may be partly removed therefrom for selectively allowing a light beam irradiated on the substrate to pass therethrough to reach the optical data recording layer.

33 Claims, 22 Drawing Sheets

OPTICAL DATA RECORDING MEDIUM

BACKGROUND OF THE INVENTION

1. Field of the Invention

The present invention relates to an optical data recording medium for optically recording data therein and for optically reproducing the data recorded therein. More specifically, the present invention relates to an optical data recording medium capable of recording information therein with high recording density and capable of reproducing the information recorded therein with high reproducibility.

2. Description of Related Art

One type of a conventional optical data recording medium is shown in FIG. 1. The optical data recording medium 80 includes a transparent substrate 82 in which a tracking guide groove 81 is formed in concentrical or spiral fashion, a first protective layer 83 formed over the substrate 82, an optical data recording layer 84 formed over the first protective layer, and a second protective layer 85 formed over the data recording layer 84. The substrate 82 is made of acrylic resin, polycarbonate resin, glass, or the like. The first protective layer 83 is formed of oxide material such as $SiO_2$, nitride material such as AlN, or the like. The data recording layer 84 is made of magnetooptic material such as TbFeCo, GdTbFe and TbCo, phase-change material such as GeSbTe, pit formable material such as metal and dye, or the like. The second protective layer 84 is formed of oxide material such as $SiO_2$, nitride material such as AlN, resin, or the like.

In the data recording medium 80 having the above-described structure, as illustrated in FIG. 2, the tracking guide groove 81 is formed so that a groove width $W_g$, a groove-to-groove distance $W_L$, and a track pitch P may satisfy the following equation $P=W_G+W_L$ and so that the track pitch P may be set to be approximately equal to a spot diameter dS of a laser beam spot to be irradiated on the data recording medium 80. In addition, as shown in FIGS. 4 and 5, preformat pits 87 are formed on land portions 86 of the substrate 82.

The substrate 82 thus formed with the tracking guide groove 81 and the preformat pits 87 is produced through the following manner.

First, a photoresist with its thickness having a value equal to or lower than 0.1 μm, for example, is formed over a glass plate, through a spin coating process. The photoresist is irradiated with laser beam in such a manner that a laser beam spot formed on the photoresist is moved relative to the photoresist concentrically or spirally with a fixed pitch. The laser beam irradiation is performed continuously and intermittently. The continuously irradiated laser beam will form a groove extending concentrically or spirally and the intermittently irradiated laser beam will form pits which are arranged concentrically or spirally. Then, the photoresist is subjected to a development process, so that a mask member consisting of the glass substrate and the photoresist formed with the groove and the pits is obtained.

Then, an electro-conductive film is provided over the mask member before being subjected to an electro-forming process. Thus, a nickel stamper is produced. The nickel stamper is then subjected to resin molding operation such as a photopolymerization process or an injection molding process. Accordingly, resin is molded into the substrate 82 onto which are transferred the groove and the pits. Thus, the substrate 82 formed with the tracking guide groove 81 and the preformat pits 87 is obtained.

In order to record data into the data recording medium 80, on the other hand, as shown in FIG. 1, laser beam is irradiated on the data recording layer 84 through the substrate 82 to locally heat the data recording layer. As a result, the heated portion of the data recording layer undergoes inversion of magnetization, phase change, or formation of pit. Thus, a data recording bit is formed in the data recording layer. In order to reproduce the data thus recorded in the data recording layer 84, a laser beam is also irradiated on the data recording layer 84, and the laser beam reflected from the data recording layer is detected. More specifically, change in rotation angle of a polarization plane of the reflected laser beam or change in intensity of the reflected laser beam is detected.

In order to increase a data recording density of the above-described data recording medium 80, it is necessary to narrow the track pitch P. In the case where the track pitch P becomes smaller than the spot diameter dS of the laser beam spot 91, however, the following problem will occur. As shown in FIG. 3, in the case where the laser beam spot 91 traces a particular track 92 in order to reproduce data recorded in the track, the laser beam spot 91 fails to be irradiated only on the track 92 but is irradiated not only on the track 92 but also a neighboring track 93. The laser beam spot is therefore erroneously irradiated onto a part of a data recording bit 94 which is formed in the neighboring track 93. Accordingly, the laser beam spot tracing the particular track 92 picks up not only desired information recorded on the particular track 92 but also unwanted information on the neighboring track 93. Thus, cross-talk is occurred.

In addition, the conventional data recording medium 80 has a problem that the tracking guide groove 81 and the preformat pits 87 formed on the substrate 82 through the injection molding process are liable to have undesired shapes. In other words, a yield rate of the data recording medium 80 has a small value. This tendency would be particularly acknowledged if the groove width $W_G$ is decreased to enhance the data recording density of the data recording medium.

FIG. 6 shows one example of the above-described conventional optical data recording medium 80 which applies magnetooptic material as the data recording layer 84. The conventional magnetooptic data recording medium 170 includes a transparent substrate 172 made of polycarbonate resin or the like which is formed with a tracking guide groove 171, an interference layer 174 made of SiAlON, AlN or the like which is formed over the substrate 172, a magnetooptic data recording layer 176 made of GdTbFe, TbFeCo or the like which is formed over the interference layer 174, a protective layer 178 made of SiAlON, AlN or the like which is formed over the data recording layer 176, and a reflective layer 180 made of Al or the like which is formed over the protective layer 178. In order to record data in the data recording medium 170, laser beam is irradiated on the data recording layer 176 to locally heat it to a temperature equal to or higher than its Curie temperature or its Compensation temperature. Simultaneously, magnetic field is applied to the heated portion of the data recording layer 176, to thereby invert a direction of magnetization exhibited in the heated portion.

In order to reproduce the data thus recorded in the data recording layer 176, a linearly polarized laser beam is irradiated on the data recording layer 176 through the substrate 172. A polarization plane of the linearly polarized laser beam is rotated by a Kerr rotation angle at the time when the laser beam is reflected at the data recording layer 176. A direction in which the polarization plane is rotated at the Kerr rotation angle depends on the direction of the magnetization occurred in the data recording layer 176. Accordingly, in order to reproduce the data recorded in the data recording layer, the rotating direction of the polarization plane of the laser beam is detected.

In the data reproducing operation, the laser beam irradiated on the data recording medium from its substrate side is partly reflected at an interface defined between the substrate 172 and the interference layer 174, at an interface defined between the interference layer 174 and the data recording layer 176, at an interface defined between the data recording layer 176 and the protective layer 178, and at an interface between the protective layer 178 and the reflective layer 180. In other words, the laser beam undergoes multiple reflection both in the interference layer 174 and the protective layer 178. As a result, a plurality of reflective laser beams are generated at the respective interfaces and travel back to the substrate 172. The plural reflective laser beams meet one another and interfere with one another, to thereby constitute a single reflective laser beam to be outputted from the data recording medium 170. In the conventional data recording medium 170, thickness of the interference layer 174 is selected to approximately $\lambda/(4n_2)$ where $n_2$ represents an index of refraction of the interference layer and $\lambda$ represents a wavelength of the laser beam in vacuum space so that the reflectivity of the interference layer 174 may be minimized. In addition, the thickness of the data recording layer 176 is selected to such a value as minimizes the reflectivity of the data recording layer. Since the data recording medium 170 has such a structure, the interference occurred among the reflective laser beams generated at the respective interfaces undergoes destructive interference, to thereby largely increase an apparent Kerr rotation angle of the laser beam outputted from the data recording medium. (This phenomenon is called as a "Kerr effect enhancement", hereinafter.) As a result, carrier-to-noise ratio (C/N ratio) of the data recording medium is largely enhanced.

The conventional data recording medium 170, however, has the following disadvantage. The thickness of the interference layer and the data recording layer are selected to such values as minimize the reflectivities of the interference layer and the data recording layer, as described above. Thus, the interference layer and the data recording layer have reflectivities of low values, at their entire areas. Thus, the conventional data recording medium 170 has a low value of reflectivity, even at its tracking guide groove 171. It is noted, however, that intensity of reflective laser beam reflected from the tracking guide groove 171 is detected and a tracking error signal is produced for tracking servo operation. Thus, the conventional data recording medium 170 having the low value of reflectivity at its tracking guide groove may not obtain a tracking error signal having an amount proper to attain a stable tracking servo operation. The data recording medium therefore may not attain a stable recording and reproducing operations.

SUMMARY OF THE INVENTION

The present invention is achieved to solve the above-described problems of the conventional optical data recording medium.

An object of the present invention is therefore to provide an optical data recording medium which has a small track pitch to attain a high data recording density while preventing cross-talk from being increased.

Another object of the present invention is to provide an optical data recording medium in which tracking guide grooves and preformat pits having undesired shapes are not liable to be produced.

A further object of the present invention is to provide a magnetooptic data recording medium which is capable of largely enhancing its Kerr effect to thereby attain an increased C/N ratio without reducing intensity of a tracking error signal required for the tracking servo operation to thereby attain a stable tracking servo operation.

In order to attain the above objects, an optical data recording medium of the present invention for optically recording data therein and for optically reproducing the data therefrom includes: a substrate; a reflective material layer formed of light-reflective material, the reflective material layer being provided over said substrate; and an optical data recording layer for optically recording data therein and for optically reproducing the data thus recorded therein, the optical data recording layer being formed over the reflective material layer. The reflective material layer is patterned so that the light-reflective material may be partly removed from the reflective material layer for selectively allowing light beam irradiated on the substrate to pass therethrough to reach the optical data recording layer.

The optical data recording medium of the present invention may further include an interference layer provided between the reflective material layer and the optical data recording layer, the interference layer being formed of dielectric material having an index of refraction which has a value larger than that of the substrate.

Or otherwise, the optical data recording medium may further include a first interference layer formed of dielectric material and a second interference layer formed of dielectric material, the first interference layer being provided between the substrate and the reflective material layer and the second interference layer being provided between the reflective material layer and the optical data recording layer.

With such a structure, the reflective material layer, the optical data recording layer and the interference layer (the first and second interference layers) may be produced through a well-known film forming process and photolithography process. Accordingly, it becomes unnecessary to produce the optical data recording medium through injection molding process. Thus, it becomes easy to produce the optical data recording medium in the case where a track pitch of the data recording medium is narrowed to enhance a data recording density thereof.

In the optical data recording medium of the invention, the reflective material layer is patterned to partly remove the light-reflective material from the reflective material layer so that areas from which the light-reflective material is thus removed are continuously arranged to define a data recording and reproducing area which is adapted for allowing a light beam irradiated on the substrate to pass therethrough to reach the optical data recording layer to thereby record data in the optical data recording layer and reproduce the data recorded in the optical data recording layer. The data recording and reproducing area is formed to continuously extend, defining a track. More specifically, the reflective material layer is patterned so as to form a plurality of data recording tracks in such a manner that the light-reflective material remains on the reflective material layer at a tracking guide area defined between each two neighboring (adjacent) tracks.

Since the reflective material is thus remained on the reflective material layer at both sides of each data recording and reproducing area, even in the case where the light beam having the spot diameter larger than the track pitch is irradiated on the data recording medium at the data recording and reproducing area of a particular track, the light beam cannot reach the optical data recording layer at the data recording and reproducing area of a neighboring track positioned adjacent to the particular track. Accordingly, in the case where a laser beam is irradiated on the data recording medium for reproducing data recorded in a data recording and reproducing area of a particular track, the laser beam cannot reproduce data recorded in another data recording and reproducing area of a neighboring track, positioned adjacent to the particular track. Accordingly, cross-talk is not increased.

More specifically, the data recording and reproducing area and the tracking guide area have their widths extending perpendicularly to the track extending direction. A total value of the width of the data recording and reproducing area and the widths of the tracking guide areas positioned on each side to sandwich the data recording and reproducing area is equal to or greater than a spot diameter of a light beam irradiated on the optical data recording layer. Accordingly, in the case where the light beam is irradiated on the optical data recording medium at a particular data recording and reproducing area, no part of the light beam is erroneously irradiated on the data recording layer at a neighboring data recording and reproducing area positioned adjacent to the particular data recording and reproducing area. Thus, in the case where the track pitch is decreased to enhance the data recording density of the data recording medium, cross-talk is not increased.

In the data recording medium of the present invention, the reflective material layer may be further patterned to partly remove the light-reflective material from the reflective material layer in accordance with a preformat information so that areas from which the light-reflective material is thus removed are discontinuously arranged in accordance with the preformat information along the track so as to define a preformat area which is adapted for receiving a light beam irradiated on the substrate and for optically modulating the light beam in accordance with the preformat information.

Since the preformat area is thus formed through simply removing the light-reflective material from the reflective material layer, the preformat area is not liable to be produced to have an undesired shape, and therefore yield rate of the data recording medium is greatly enhanced.

The data recording and reproducing area and the preformat area have their widths extending perpendicularly to the data track extending direction, and the width of the data recording and reproducing area preferably has a value equal to or larger than that of the preformat area. Accordingly, the C/N characteristics of the data recording medium is further greatly enhanced.

In the case where the substrate is of a disk shape, the width of the data recording and reproducing area and a track pitch defined as a distance between each two adjacent data tracks may preferably decrease away from the center toward the outer periphery of the disk-shaped substrate, so that the data recording density of the data recording medium may be further enhanced.

The reflective material layer may be further patterned to partly remove the light-reflective material from the reflective material layer so that the light-reflective material provided at the area defined between each two adjacent tracks may be completely removed from said substrate to define a mirror part. The mirror part will provide an offset signal representative of a shift amount of an optical axis of the laser beam irradiated on the data recording medium and an inclination amount of the data recording medium. The offset signal will be utilized for neglecting a DC offset component of a tracking error signal.

Particularly in the case where the data recording medium of the present invention is provided with the interference layer, since the interference layer is formed of the dielectric material with its index of refraction being greater than that of the substrate, multiple reflection of light beam occurs in the interference layer. Accordingly, a reflectivity of the data recording layer is lowered and the Kerr effect enhancement is attained, so that an apparent Kerr rotation angle is greatly increased and the C/N ratio of the data recording medium is enhanced. Furthermore, since the reflectivity of the tracking guide area where the light-reflective material remains is not lowered, it is possible to attain a stable tracking characteristic.

Furthermore, particularly in the case where the data recording medium of the present invention is provided with the first and second interference layers, since the first and second interference layers are formed of the dielectric material with its index of refraction being greater than that of the substrate, multiple reflection of the light beam occurs in the first and second interference layers.

Thickness of the first interference layer and thickness of the second interference layer preferably have values allowing a phase change amount of approximately $\pi+m(2\pi)$, where m is an integer, occursin a light beam as the light beam travels through the first and second interference layers from a first interface defined between the substrate and the first interference layer toward a second interface defined between the second interference layer and the optical data recording layer, returns at the second interface to travel again through the second and first interference layers in this order and reaches the first interface. Accordingly, the Kerr effect enhancement is increased due to the multiple reflection occurring in the first and second interference layers, so that the C/N ratio of the data recording medium is greatly enhanced.

The thickness of the first and second interference layers may preferably have values allowing an amount of phase difference between a reflection beam reflected from the optical data recording medium at an area from which the light-reflective material is removed and a reflection beam reflected from the optical data recording medium at an area where the light-reflective material remains to have approximately a value of $\pi/2+m\pi$ where m is an integer. With such a structure, a push-pull type tracking error signal is obtained to have its maximum value. Accordingly, the reflectivity of the data recording medium at the tracking guide area where the light-reflective material remains is not decreased relative to that at the data recording and reproducing area from which the light-reflective material is removed. Accordingly, the value of the tracking error signal can be prevented from being lowered, and a stable tracking servo operation can be certainly achieved.

More specifically, the optical data recording medium of the present invention should preferably be so designed that an amount of phase difference between a reflection beam reflected from the optical data recording medium at its area from which the light-reflective material is removed and a reflection beam reflected from the optical data recording medium at its area where the light-reflective material remains may have a value other than $\pi+m\pi$ where m is an integer. For example, the optical data recording medium of the present invention should be so designed that a difference amount between a phase change amount occurring in a light beam as the light beam travels through the first and second interference layers from the first interface toward the second interface, reflects at the second interface to travel again through the second and first interference layers and returns to the first interface and a phase change amount occurring in a light beam as the light beam travels through the first interference layer from the first interface toward a third interface defined between the first interference layer and the light-reflective material remaining on the first interference layer, reflects at the third interface to travel again through the first interference layer and returns to the first interface may have approximately a value other than $\pi+m\pi$ where m is an integer. For example, the thickness of the first and second interference layers may preferably have values allowing a phase difference amount to have the value other than $\pi+m\pi$.

Furthermore, the optical data recording medium of the present invention should preferably be designed so that an amount of phase difference between a reflection beam reflected from the optical data recording medium at its area from which the light-reflective material is removed and a reflection beam reflected from the optical data recording medium at its area where the light-reflective material remains may have approximately a value of $\pi/2+m\pi$ where m is an integer. For example, the optical data recording medium should preferably be designed so that a difference amount between the phase change amount occurring in a light beam as the light beam travels through the first and second interference layers from the first interface toward the second interface, reflects at the second interface to travel again through the second and first interference layers and returns to the first interface and a phase change amount occurring in a light beam as the light beam travels through the first interference layer from the first interface toward a third interface defined between the first interference layer and the light-reflective material remaining on the first interference layer, reflects at the third interface to travel again through the first interference layer and returns to the first interface may have approximately a value of $\pi/2+m\pi$ where m is an integer. For example, the thickness of the first and second interference layers may preferably have such values allowing the phase difference amount to have approximately the value of $\pi/2+m\pi$.

Particularly in the case where the reflective material layer is relatively thick, the thickness of the first and second interference layers may preferably have values allowing a difference amount between the phase change amount occurring in a light beam as the light beam travels through both the first and second interference layers from the first interface toward the second interface, reflects at the second interface to travel again through both the second and first interference layers in this order and returns to the first interface and a phase change amount occurring in a light beam as the light beam travels through only the first interference layer from the first interface toward a third interface defined between the first interference layer and the light-reflective material remaining on the first interference layer, reflects at the third interface to travel again through only the first interference layer and returns to the first interface to have approximately a value of $\pi/2+m\pi$ where m is an integer.

Indices of refraction of the first and second interference layers are preferably selected to be equal to each other. In this case, undesired reflection of light beam does not occur at an interface between the first and second interference layers so that the C/N ratio and the tracking characteristics of the data recording medium are greatly enhanced.

The thickness of the second interference layer may preferably have approximately a value represented by $[\lambda/4n_2\pm\lambda/12n_2]+m\lambda/2n_2$ where $n_2$ represents the index of refraction of the second interference layer, $\lambda$ represents a wavelength, in a vacuum space, of a light beam to be irradiated on the optical data recording medium and m represents an integer. In this case, the push-pull type tracking error signal is obtained having a value slightly smaller than its maximum value, but a preformat pit reproducing signal for the preformat area is obtained having a large value. Accordingly, the data recording medium of the present invention can be used also as a preformat disk.

Other objects, features and advantages of the present invention will become apparent in the following specification and accompanying drawings.

BRIEF DESCRIPTION OF THE DRAWINGS

Throughout the accompanying drawings, the same or like reference numerals or characters refer to the same or like parts.

PREFERRED EMBODIMENTS OF THE PRESENT INVENTION

A first preferred embodiment of the present invention will be described with reference to FIGS. 7 through 18.

Figure 1:
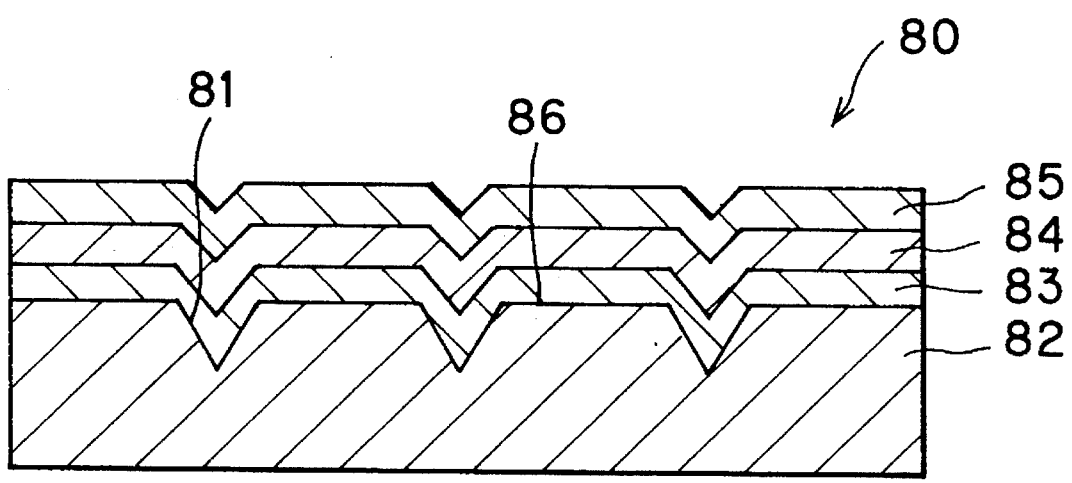
FIG. 1 is a schematic cross-sectional side view of an essential part of an example of a conventional optical data recording medium.
Figure 2:
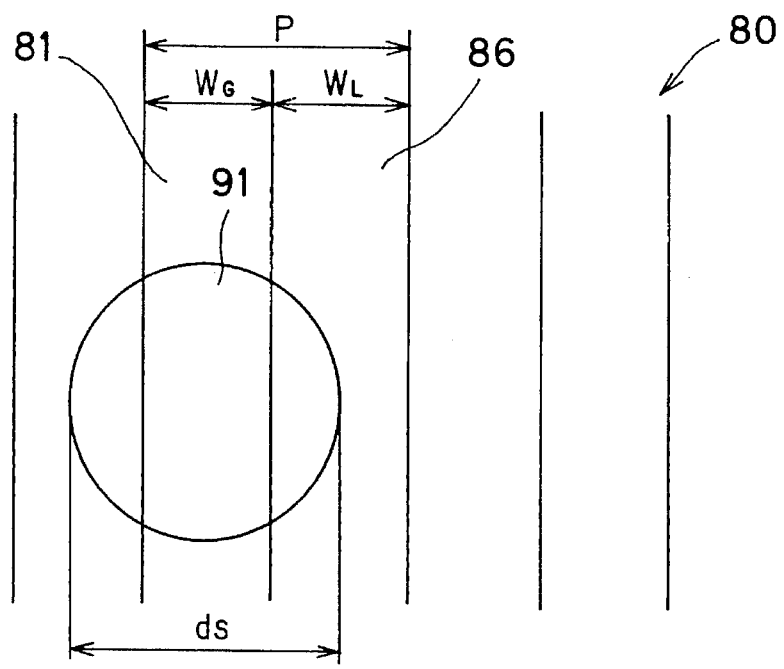
FIG. 2 illustrates the state how the laser beam spot is irradiated on the conventional optical data recording medium which is formed with tracking guide groove.
Figure 3:
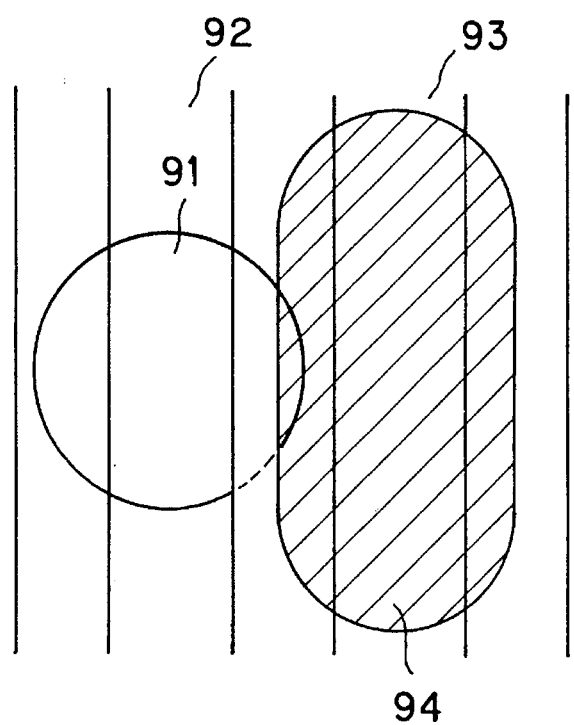
FIG. 3 illustrates the state how the laser beam spot is irradiated on the conventional optical data recording medium which is formed with a tracking guide groove.
Figure 4:
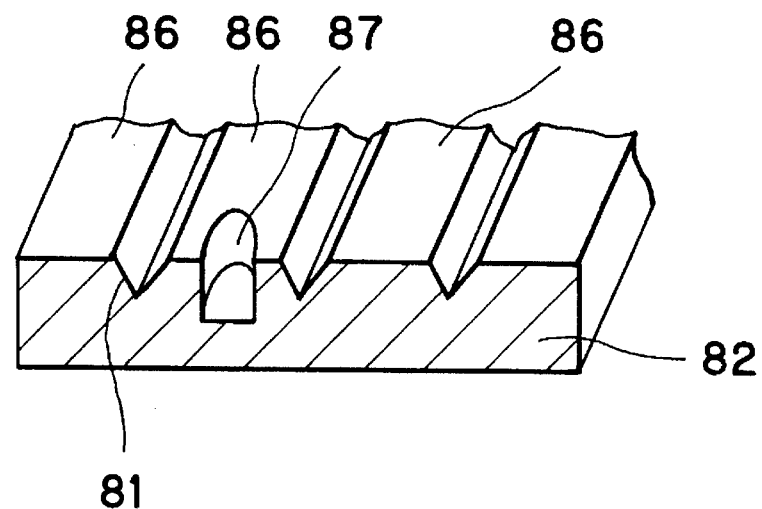
FIG. 4 schematically shows the state how the tracking guide groove and the preformat pit is formed on the substrate of the conventional optical data recording medium.
Figure 5:
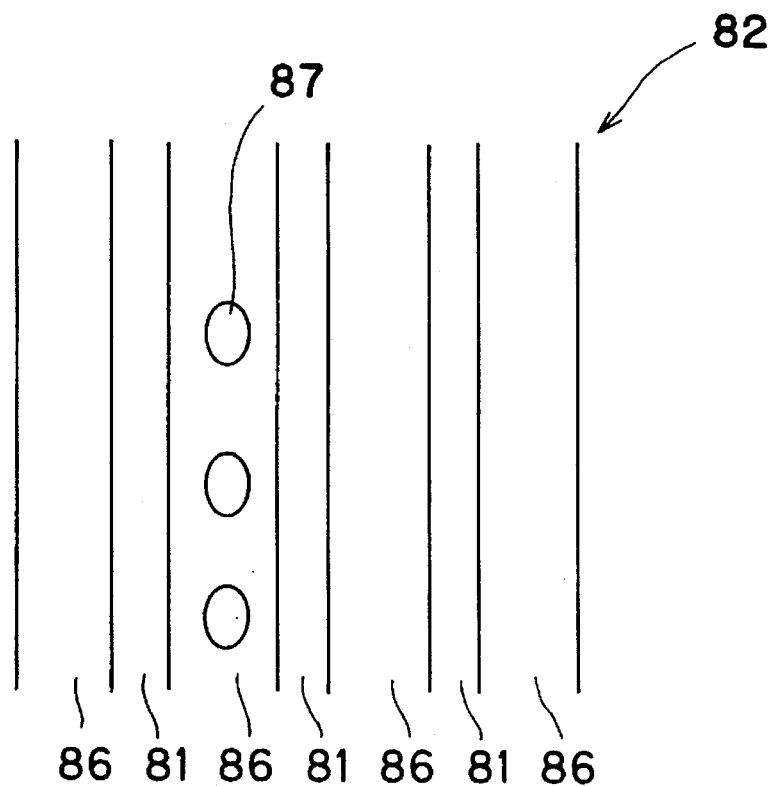
FIG. 5 is a plan view of the substrate for schematically showing the state how the tracking guide groove and the preformat pit are formed on the substrate of the conventional optical data recording medium.
Figure 6:
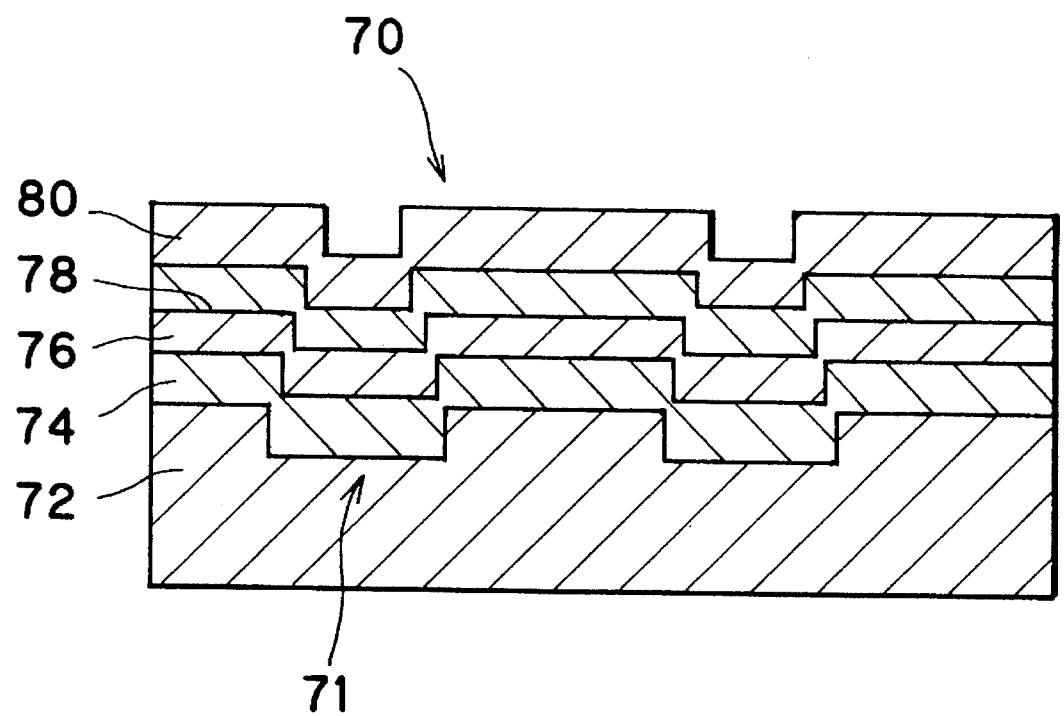
FIG. 6 is a cross-sectional side view of an essential part of a example of a conventional magnetooptic data recording medium.
Figure 7A:
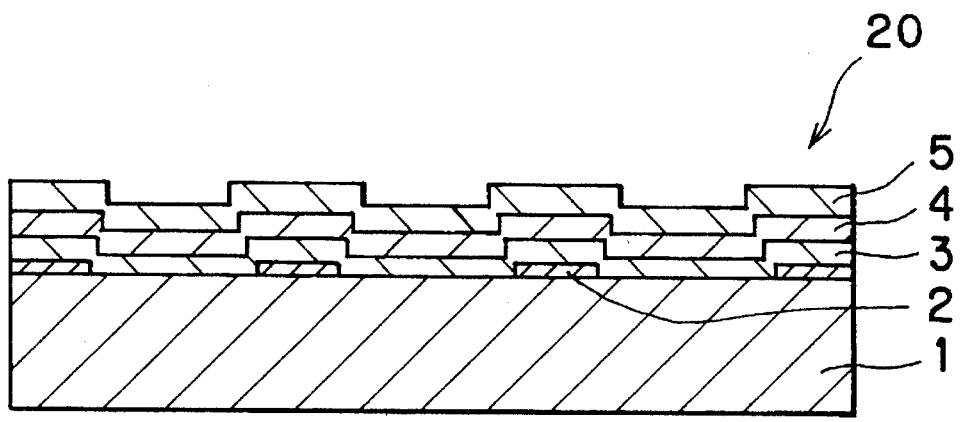
FIG. 7(a) is a cross-sectional side view of an essential part of an optical data recording medium of a first preferred embodiment of the present invention.
Figure 7B:
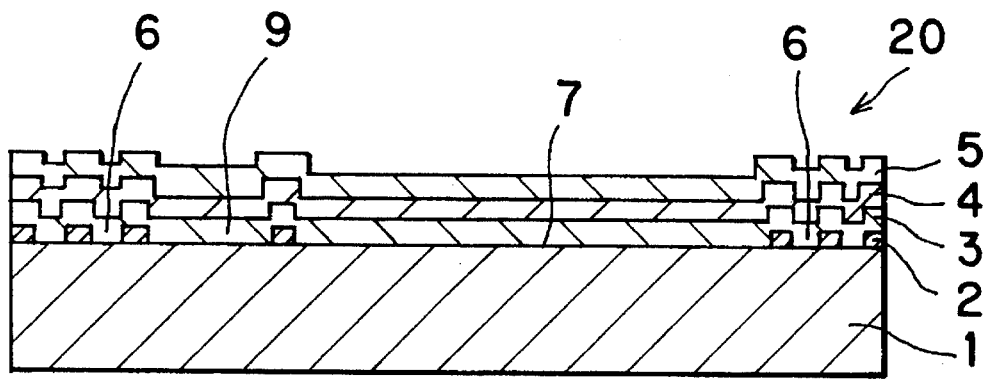
FIG. 7(b) is a sectional side view of the essential part of the data recording medium of the first embodiment.

FIG. 7(a) is a cross-sectional side view of a disk-shaped optical data recording medium 20 of the present embodiment taken along a line extending in a radius direction thereof. FIG. 7(b) is a sectional view of the data recording medium 20 taken along a line extending in a circumferential direction thereof. As shown in FIGS. 7(a) and 7(b), the data recording medium 20 includes a transparent substrate 1, a film-shaped light-reflective material (which will be referred to as a "reflective material layer") 2 formed over the substrate, an interference layer 3 formed over the reflective material layer, an optical data recording layer 4 formed over the interference layer, and a protective layer 5 formed over the data recording layer.

Figure 8:
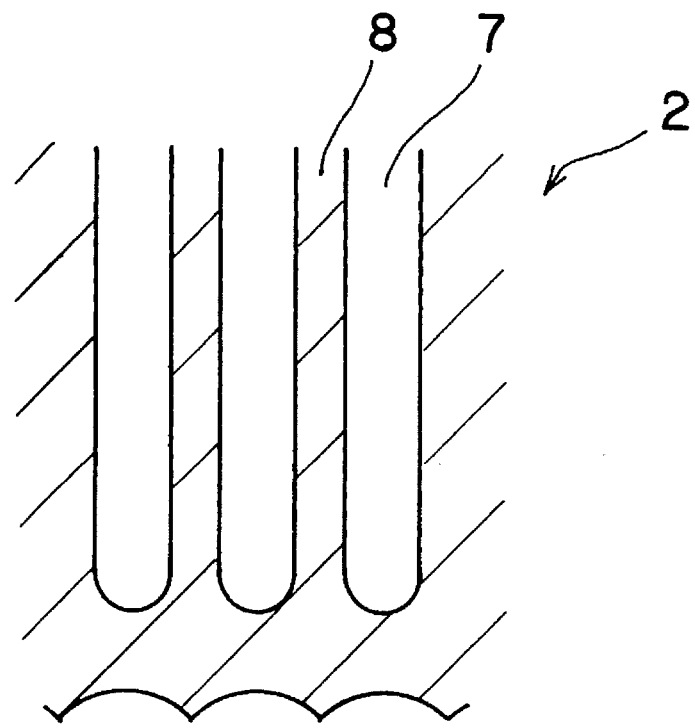
FIG. 8 is a sectional view of a reflective material layer of the data recording medium of the embodiment which illustrates the state how the light-reflective material of the reflective material layer is partially removed from the data recording medium so as to form therein patterns of preformat pits, data recording and reproducing areas and a mirror part.
Figure 8:
Figure 8:
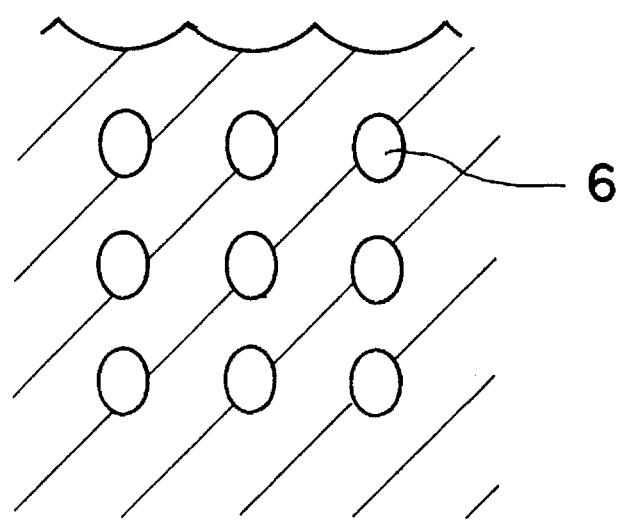

FIG. 8 is a sectional view of the reflective material layer 2 taken along a line extending parallel to a surface of the substrate 1. As apparent from FIG. 8, the reflective material layer 2 is partly removed from the substrate 1 in concentrical or in spiral fashion. More specifically the reflective material layer 2 is partly removed discontinuously so that there are formed a plurality of areas 6 from which the light-reflective material is thus removed, arranged concentrically or spirally. The parts 6 serve as preformat pits 6 for providing sector mark signals, address mark signals, synchronizing signals, etc. The reflective material layer 2 is also partly removed from the substrate 1 continuously so that there is formed an area 7 from which the light-reflective material is removed and extends concentrically or spirally. The area 7 serves as data recording and reproducing area 7 into which data is to be recorded and from which data is to be reproduced. More specifically to say, the reflective material layer 2 is partly removed from the substrate 1 so that a plurality of data recording and reproducing areas 7 are formed to be arranged concentrically or spirally. Reflective material 2 remaining on the substrate 1 at an area defined between each two neighboring areas 7 serves as a tracking guide area 8.

It should be noted that a width of the data recording and reproducing area 7 is selected to be equal to or larger than that of the preformat pit 6.

The reflective material layer 2 is further removed partially from the substrate 1 so that the reflective material does not remain at an area between each two neighboring tracks. An area 9 from which the reflective material is thus completely removed serves as a mirror part.

The transparent substrate 1 is formed of glass, resin (such as acrylic resin, polycarbonate resin, amorphous polyolefin resin), etc. Representative examples of the reflective material 2 include metal such as aluminum, gold, titanium, tantalum, etc., nitride such as titanium nitride, tantalum nitride, etc., semiconductor such as carbon, silicon, etc., and organic material such as dye, etc.

The interference layer 3 is formed of a transparent dielectric film material with its index of refraction having a value larger than that of the substrate 1. Representative examples of the interference layer include SiO, $TiO_2$, $ZrO_2$, SiAlON, ZnS, ZnO, SiN, AlN, etc.

Representative examples of the optical data recording layer 4 include: magnetooptic data recording material such as amorphous alloy mainly composing rare earth and transitional metal such as TbFeCo, GdTbFe, etc.; phase-change material such as GeSbTe, TeOx, etc.; and pit formable material such as metal of Te, Bi, etc., dye, etc.

The protective layer 5 serves to protect the data recording layer 4 from being chemically changed and is formed of $SiO_2$, AlN, SiAlON, or the like.

Method of producing the data recording medium 20 having the above-described structure will be described below with reference to FIGS. 9(a) through 9(e).

Figure 9A:
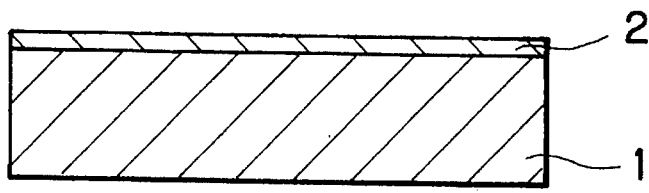
FIGS. 9(a) through 9(e) shows the process of producing the data recording medium of the embodiment.
Figure 9B:
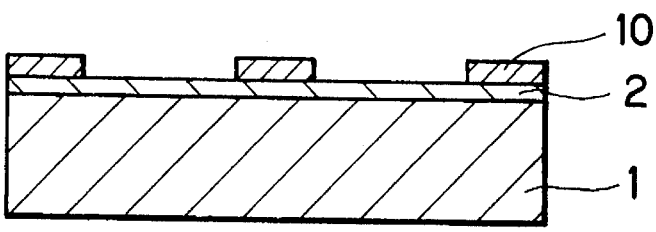
Figure 9C:
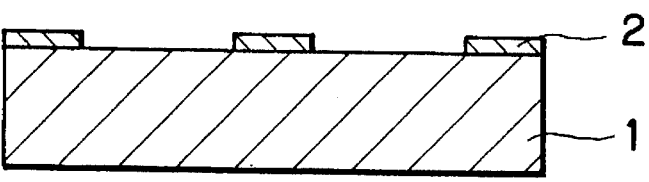

First, as shown in FIG. 9(a), the reflective material 2 is formed over the substrate 1. A photoresist 10 is provided over the reflective material 2. A laser beam is irradiated onto the photoresist 10 so that a laser beam spot formed on a surface of the photoresist may be moved concentrically or spirally. The laser beam irradiation is controlled so that the laser beam may be irradiated on the photoresist continuously and intermittently. (It is noted that in order to control the laser beam to be irradiated intermittently on the photoresist, a laser source is preferably modulated in accordance with sector mark signals, etc.) As a result, the photoresist 10 is formed with latent pattern images of the preformat pits 6, the data recording and reproducing areas 7 and the mirror areas 9 shown in FIG. 8. Thus formed latent pattern images are then developed, so that the photoresist 10 formed with the preformat pits, the data recording and reproducing areas and the mirror parts is obtained, as shown in FIG. 9(b). Then, the reflective material layer 2 is subjected to chemical etching treatment with the use of acid and alkali solution or is subjected to plasma etching treatment. As a result, parts of the reflective material 2 which are not covered with the photoresist 10 (and therefore which correspond to the data recording and reproducing areas, the preformat pits and the mirror areas) are removed from the substrate 1. Then, as shown in FIG. 9(c), the photoresist 10 is entirely removed from the substrate 1, with the use of organic solvent, or the like. Accordingly, there is obtained the substrate 1 covered with the reflective material layer 2 which is formed with the preformat pits 6, the data recording and reproducing areas 7, the tracking guide areas 8 and the mirror areas 9.

Figure 9D:
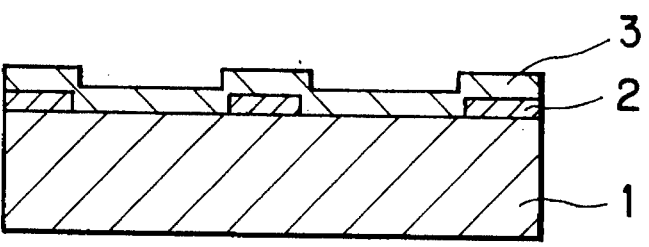
Figure 9E:
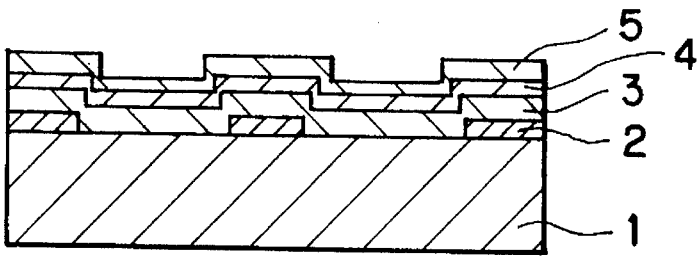

Then, as shown in FIG. 9(d), the interference layer 3 is formed over the reflective material layer 2 through a well-known sputtering process or a still well-known vacuum deposition process. As shown in the FIG. 9(e), the data recording layer 4 is then formed over the interference layer 3 through the sputtering process, the vacuum deposition process, a spin coating process, or the like so that the data recording layer 4 may have a substantially uniform thickness. As also shown in FIG. 9(e), the protective layer 5 is formed over the thus formed data recording layer 4 through the sputtering process, the vacuum deposition process, the spin coating method, or the like.

According to the method of producing the data recording medium of the present embodiment, as described above, a tracking guide groove is not formed on the substrate through the injection molding operation, contrary to the conventional method of producing the data recording medium. According to the present embodiment, the data recording and reproducing area 7 can be formed through simply removing the reflective material from the reflective material layer 2. Thus, the data recording and reproducing area 7 can be easily produced, and therefore yield rate of the data recording medium can be considerably enhanced. It therefore becomes possible to easily produce the data recording medium having a small track pitch.

Figure 10:
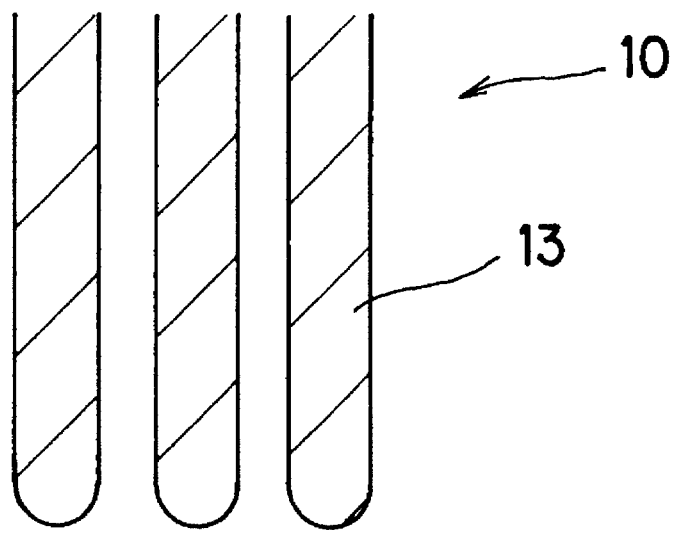
FIG. 10 illustrates the manner how the laser beam spot is irradiated on the photoresist provided over the reflective material layer.
Figure 10:
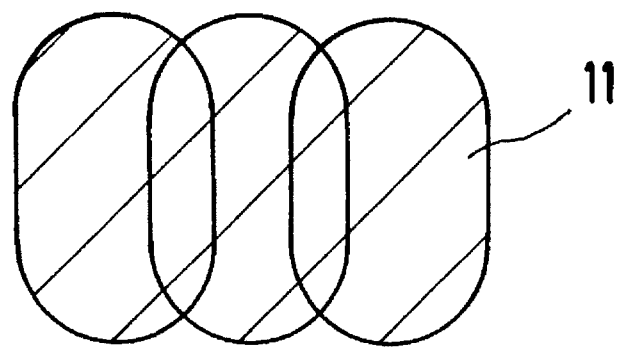
Figure 10:
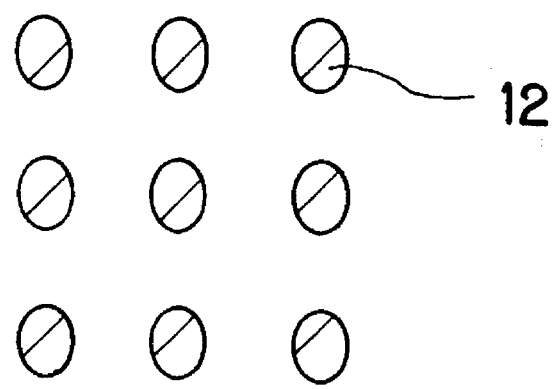

It is noted that in the step of FIG. 9(b) for forming the latent pattern images on the photoresist 10, in order to form a latent image 11 for the mirror area 9, as shown in FIG. 10, power of the laser beam irradiated on the photoresist 10 for forming the latent image 11 should be selected to be larger than those of the laser beam irradiated for forming a latent image 12 for the preformat pit 6 and a latent image 13 for the data recording and reproducing area 7. This is because the latent images 11 formed on neighboring tracks through the high power irradiation of the laser beam can be overlapped with one another so as to form a single mirror area 9.

It is further noted that in the step of FIG. 9(b), a photomask (not shown in the drawing) having patterns of the preformat pits 6, the data recording and reproducing areas 7 and the mirror areas 9 may be overlaid on the photoresist 10, and uniform light may be irradiated on the photoresist 10 through the photomask. The photomask thus formed with the patterns of the preformat pits 6, the data recording and reproducing areas 7 and the mirror areas 9 may be produced through processes as described below. Chromium is first deposited on a glass substrate. Then, a photoresist is coated on the chromium thus provided on the substrate. Then, laser beam is irradiated on the photoresist so that a laser beam spot formed on the photoresist may be moved concentrically or spirally. The irradiation of the laser beam is controlled so that the laser beam may be irradiated on the photoresist continuously and intermittently. As a result, the latent pattern images of the preformat pits 6, the data recording and reproducing areas 7 and the mirror parts 9 as shown in FIG. 8 may be formed on the photoresist. The photoresist is then subjected to the development process and the etching treatment. As a result, a photomask consisting of the glass substrate and the chromium layer formed with the preformat pits 6, the data recording and reproducing areas 7 and the mirror areas 9 is obtained.

The optical data recording medium 20 of the present embodiment produced as described above is subjected to data recording and data reproducing operation, as described below.

In order to record desired information in the data recording medium 20, a laser beam is irradiated on the data recording layer 4 through the substrate 1, to thereby locally heat the data recording layer. As a result, inversion of magnetization, phase change or a pit formation is occurs locally in the data recording layer 4, so that the desired information is recorded therein. In order to reproduce the information thus recorded in the data recording layer, on the other hand, the laser beam is irradiated on the data recording layer 4, and the laser beam reflected from the data recording layer is detected. More specifically to say, change in an amount of a rotation angle of a polarization plane of the reflected laser beam or change in intensity of the reflected laser beam is detected, to thereby reproduce the information recorded in the data recording layer. In order to perform a tracking operation, a well-known push-pull type tracking operation can be achieved with the use of the laser beam reflected to be diffracted at the tracking guide area 8 and the data recording and reproducing area 7. A well-known three beam type tracking operation can be also performed.

Figure 11:
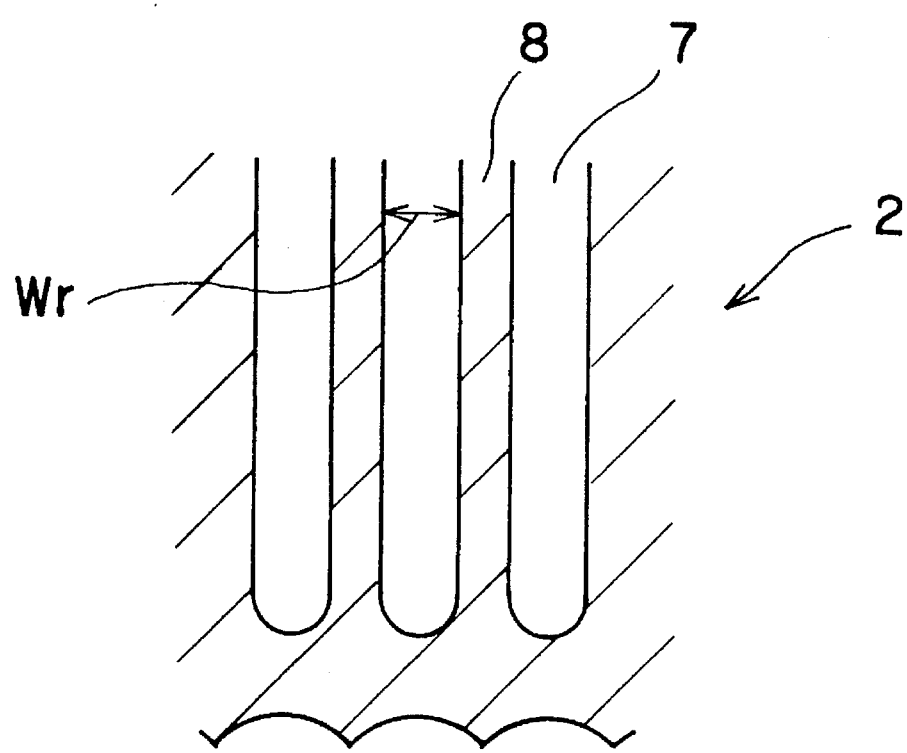
FIG. 11 shows a dimensional relationship between patterns formed in the reflective material layer of the data recording medium of the embodiment.
Figure 11:
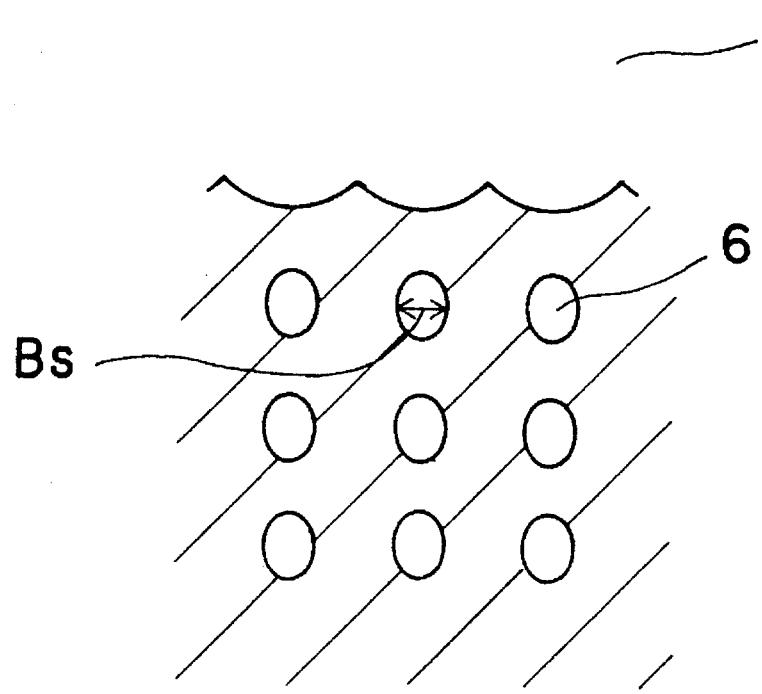

In the data recording medium 20 of the present embodiment, as apparent from FIG. 11, a width $W_r$ of the data recording and reproducing area 7 is set to be equal to or larger than a width $B_s$ of the preformat pit 6. In other words, the widths $W_r$ and $B_s$ have such values as satisfying the following equation (1), $$W_r \geq B_s \quad (1)$$

Thus, the width of the data recording and reproducing area 7 is sufficiently large, and therefore it becomes possible to maintain a high C/N ratio, even in the case where the track pitch is narrowed to perform a high density data recording operation. Accordingly, it is certainly possible to perform the high density data recording operation without deteriorating the C/N ratio.

Figure 12A:
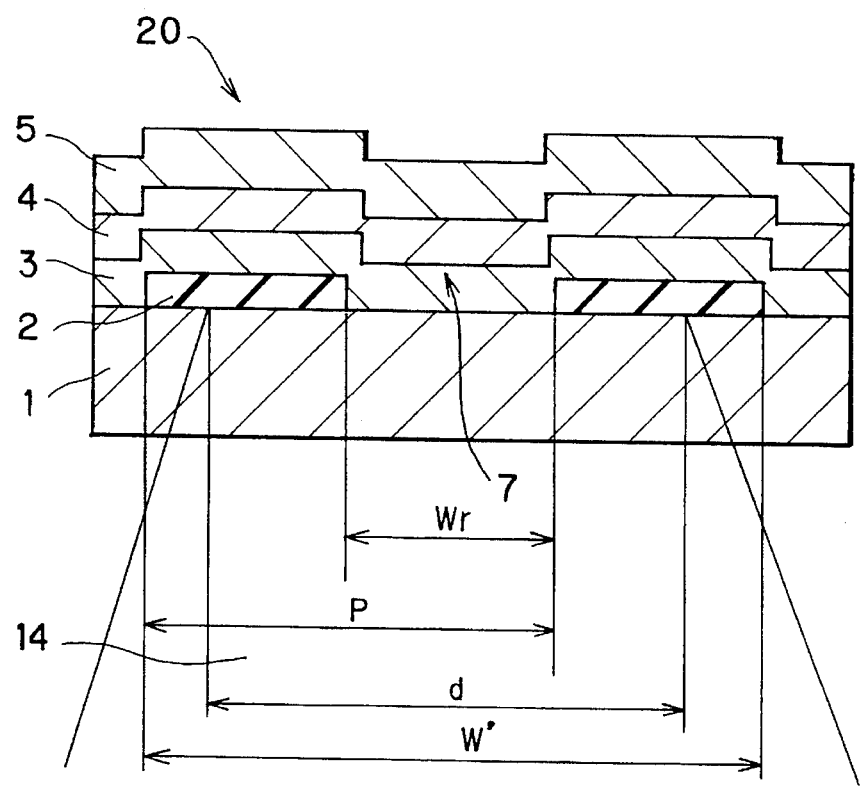
FIG. 12(a) illustrates the manner how the laser beam spot is irradiated on the data recording medium of the first embodiment to record data in the data recording layer thereof.
Figure 12B:
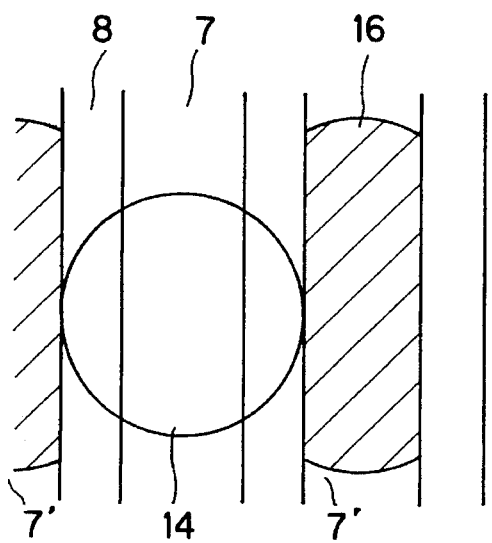
FIGS. 12(b) and 12(c) illustrate the manner how the laser beam spot is irradiated on the data recording medium of the embodiment to reproduce data recorded in the data recording layer thereof.
Figure 12C:
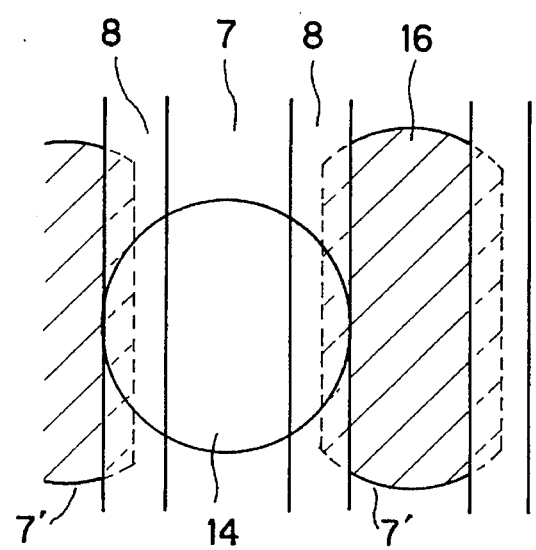

According to the data recording medium 20 of the present embodiment, furthermore, as illustrated in FIG. 12(*a*), in the case where a laser beam spot 14 is irradiated on the data recording medium for recording data in the data recording layer 4 at a particular data recording and reproducing area 7, the laser beam spot 14 traces the particular data recording and reproducing area. As a result, most part of the laser beam spot is irradiated on the particular data recording and reproducing area, but a small part of the laser beam spot is irradiated on a pair of tracking guide areas 8 which are positioned to sandwich therebetween the particular data recording and reproducing area. The reflective material remaining at the pair of tracking guide areas 8 can prevent the part of the laser beam spot thus irradiated thereon from reaching the data recording layer 4. Accordingly, a width of a data bit or a magnetic domain to be formed in the data recording layer 4 at the particular data recording and reproducing area 7 is limited to a width of the data recording and reproducing area.

As apparent from FIG. 12(*a*), a total width W' of the width $W_r$ of the data recording and reproducing area 7 and the widths of the tracking guide areas 8 provided on both sides of the data recording and reproducing area 7 to sandwich therebetween the area 7 satisfies the following equation (2), $$W' = P + (P - W_r) = 2P - W_r \quad (2)$$

where P represents the track pitch. In such a construction, therefore, in the case where the total width W' is equal to or larger than the spot diameter d of the laser beam spot irradiated on the data recording layer 4, no part of the laser beam spot can be irradiated on neighboring data recording and reproducing areas 7' which are positioned adjacent to the particular data recording and reproducing area 7, and therefore cross-talk does not be occur. More specifically to say, in the case where the track pitch P and the width $W_r$ satisfy the following equation (3), even if the track pitch P is narrowed to enhance its data recording density, cross-talk will not be increased.

$$d = 2P - W_r \quad (3)$$

Accordingly, the data recording medium 20 of the present embodiment is designed so as to satisfy the equation (3). Thus, it becomes possible to select the value of the track pitch P to be smaller than the laser beam spot diameter d while preventing the cross-talk from being increased. Accordingly, it is possible to narrow the track pitch of the data recording medium for enhancing the data recording density.

In addition, as illustrated in FIG. 12(*b*), in the case where the laser beam spot 14 traces the particular data recording and reproducing area 7 for reproducing data recorded in the area 7, the pair of tracking guide areas 8 provided to sandwich the area 7 therebetween can also prevent the part of the laser beam spot 14 irradiated thereon from reaching the data recording layer 4. No part of the laser beam spot 14 can therefore reach the data recording layer 4 at the neighboring data recording and reproducing areas 7' which are positioned next to the particular data recording and reproducing area 7. Accordingly, the laser beam spot 14 cannot reproduce data bits 16 which are recorded in the neighboring data recording and reproducing areas 7'. In the data recording medium 20 of the present embodiment having the above-described structure, therefore, it is possible to narrow the track pitch to attain a high density data recording operation while preventing the cross-talk from being increased.

Additionally, as illustrated in FIG. 12(*c*), during when the data bit 16 is recorded in the data recording layer 4 at the neighboring data recording and reproducing area 7', there is a possibility that the area of the data bit 16 may expand its area in the data recording layer 4 toward such an area as positioned under the tracking guide film area 8, as indicated by slanted lines in FIG. 12(*c*), due to heat diffusion occurred in the data recording layer. In such a case, when the laser beam spot 14 traces the particular data recording and reproducing area 7 for reproducing data recorded in the area 7, the reflective material 2 remained at the tracking guide area 8 prevents the part of the laser beam spot irradiated thereon from reaching the data recording layer 4. Accordingly, the data bit 16 recorded in the data recording layer 4 under the tracking guide area 8 is never reproduced, and therefore the cross-talk is not increased.

The mirror area 9 provides an offset signal representative of a shift amount of an optical axis of the laser beam irradiated on the data recording medium 20 and an inclination angle of the data recording disk 20. With the use of the offset signal, it is possible to neglect a DC offset component of a tracking error signal.

It is further noted that values of the widths of the data recording and reproducing area 7 and the preformat pit 6 should not be particularly limited. However, the width of the data recording and reproducing area 7 should preferably have a value equal to or close to that of the diameter of the laser beam spot irradiated on the date recording medium in the data reproduction operation. In addition, the width of the preformat pit 6 should preferably have a value equal to or close to that of a half of the spot diameter of the data reproducing laser beam.

In addition, it may be preferable that values of the width of the data recording and reproducing area 7 and the track pitch should decrease away from the center of the disk-shaped data recording medium 20 so that an outer peripheral part of the data recording medium has the smallest width of the data recording and reproducing area and the smallest track pitch for the following reasons. When information is recorded in the data recording medium 20, the disk-shaped data recording medium is rotated with a fixed rotational speed. Accordingly, the length of the data bit recorded in the data recording medium increases away from the center of the data recording medium. Therefore, even though the width of the data recording and reproducing area 7 at the outer peripheral side of the data recording medium 20 has a small value, it is possible to prevent the data recording and reproducing characteristics such as the C/N ratio at the outer peripheral side from being deteriorated. Accordingly, it is possible to narrow the track pitch at the outer peripheral side of the data recording medium to thereby enhance the data recording density, while preventing the data recording and reproducing characteristics from being deteriorated.

In the data recording medium of the present embodiment, thickness of the interference layer 3 is selected to such a value as can enhance the C/N ratio without deteriorating the tracking servo performance, as will be described below in great detail with reference to an example of a magnetooptic data recording medium to which applied is the present embodiment.

Figure 13:
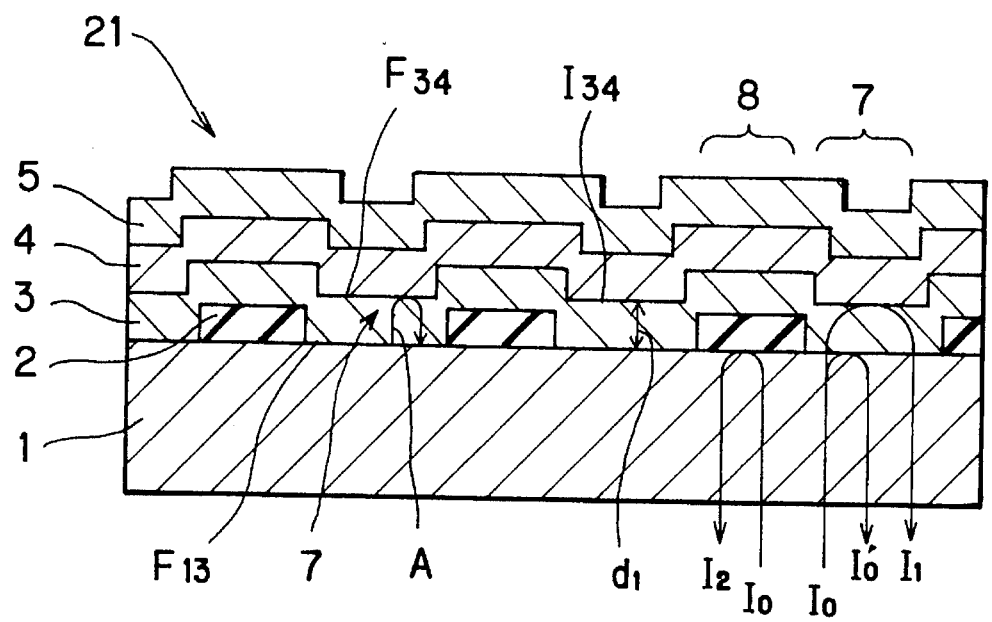
FIG. 13 is a cross-sectional side view of an essential part of a magnetooptic data recording medium of an example of the first preferred embodiment of the present invention.

FIG. 13 shows a magnetooptic data recording medium 21 to which applied is the present embodiment. The data recording medium 21 includes the substrate 1, the reflective material layer 2, the interference layer 3, the data recording layer 4 formed of magnetooptic data recording material, and the protective layer 5. Representative examples of the magnetooptic data recording material include rare earth and transitional metal alloy such as TbFeCo, GdTbFe, etc., a multi-layered film of PtCo and PdCo, magnetic oxide such as rare earth ferrum garnet, etc., and combination material formed of the above materials.

Figure 14:
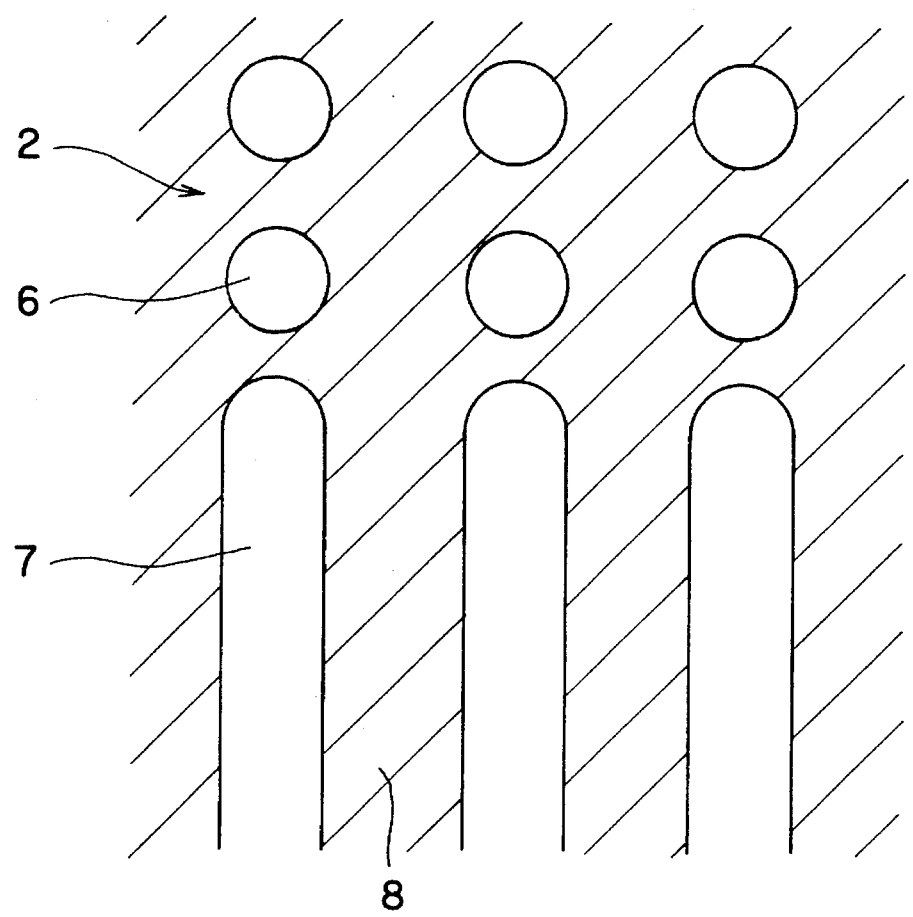
FIG. 14 illustrates the state how the reflective material of the reflective material layer of the magnetooptic data recording medium of FIG. 13 is partially removed from the magnetooptic data recording medium so as to form therein patterns of preformat pits and data recording and reproducing areas.

As shown in FIG. 14, in the present example, the reflective material layer 2 is partly removed from the substrate 1 so as to form the data recording and reproducing areas 7 and the preformat pits 6. The remaining part of the reflective material layer constitutes the tracking guide area 8. The mirror area 9 is not formed on the magnetooptic data recording medium of the present example.

In order to record desired information in the data recording layer of the magnetooptic data recording medium 21, laser beam is irradiated on the data recording layer 4 to thereby locally heat it and increase temperature of the heated portion to its Curie temperature or its Compensation temperature. Simultaneously, direction of magnetic field applied to the data recording layer is controlled in response to the information desired to be recorded in the data recording layer. Accordingly, when the heated portion is cooled, the direction of the magnetization occurring in the heated portion is changed in accordance with the applied magnetic field direction. Thus, the desired information is recorded in the data recording layer.

In order to reproduce the data thus recorded in the data recording layer 4, a linearly polarized laser beam is irradiated on the data recording layer through the substrate 1. When the laser beam is reflected at the data recording layer, a polarization plane of the laser beam is rotated by a Kerr rotation angle determined dependently on the direction of the magnetization which is locally presented in the data recording layer. The Kerr rotation angle is detected, to thereby reproduce the data recorded in the data recording layer.

More specifically, the reflected laser beam is first separated, by a polarization beam splitter, into its s-polarized component beam and its p-polarized component beam. Intensities of the s- and p- polarized component beams are detected by a pair of photodetectors, and a differential amplifier connected to the photodetectors outputs a differential signal representing an amount of a difference between the intensities. The differential signal therefore corresponds to a value of the Kerr rotation angle, i.e., the data recorded in the data recording layer.

In the data recording medium 21 of the present example shown in FIG. 13, since the interference layer 3 is formed of the transparent dielectric material which has an index of refraction of a high value, the laser beam irradiated on the data recording medium 21 for reproducing the data recorded therein is partly reflected at an interface $F_{13}$ defined between the substrate 1 and the interference layer 3 and partly reflected at an interface $F_{34}$ defined between the interference layer 3 and the data recording layer 4. In other words, multiple reflection has occurred in the interference layer 3. As indicated by an arrow A in FIG. 13, a phase change amount A occurs in the laser beam as the laser beam travels through the interference layer 3 from the interface $F_{13}$ toward the interface $F_{34}$, reflects at the interface $F_{34}$ and returns to the interface $F_{13}$ satisfies the following equation (4), $$A=2\ (2\pi/\lambda)n_1\ d_1 \qquad (4)$$

where $d_1$ represents a thickness of the interference layer 3, $n_1$ represents the index of refraction, and $\lambda$ represents wavelength of the laser beam in vacuum space. The phase change amount A therefore represents an amount of phase difference between a reflection beam $I_0'$ which is reflected from the interface $F_{13}$ and another reflection beam $I_1$ which is reflected from the interface $F_{34}$.

As well known in the art, in the case where the phase change amount A satisfies the following equation (5), Kerr effect enhancement obtained at the data recording layer 4 is maximized. In other words, an apparent Kerr rotation angle is largely increased, so that the C/N ratio of the data recording medium is considerably enhanced, in the case where the phase change amount A satisfies the following equation (5).

$$A=\pi+2m\pi \text{ (where m is an integer)} \qquad (5)$$

Figure 15A:
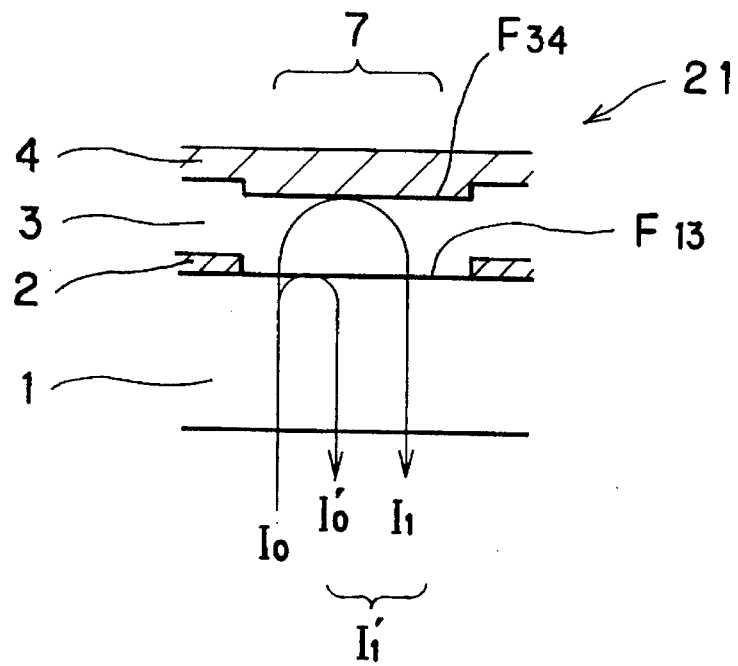
FIG. 15(a) is a schematic cross-sectional side view of the essential part of the magnetooptic data recording medium and illustrates how a laser beam propagates in the data recording medium.
Figure 15B:
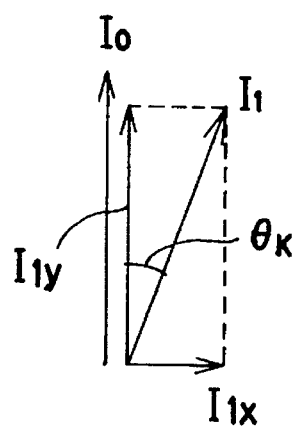
FIG. 15(b) schematically shows how the polarization plane of the laser beam is rotated by the Kerr rotation angle at the time when the laser beam is reflected at the magnetooptic data recording layer.
Figure 15C:
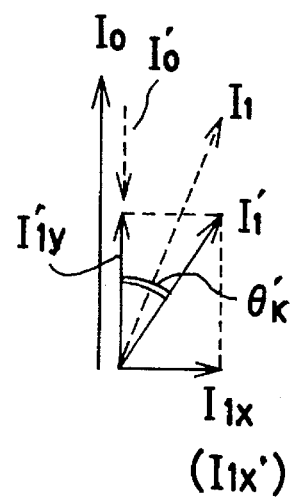
FIG. 15(c) schematically shows how the apparent Kerr rotation angle is increased.

The manner how the apparent Kerr rotation angle is increased through the maximization of the Kerr effect enhancement will be described in detail, with reference to FIGS. 15(a) through 15(c), hereinafter.

Now assume that a linearly polarized incident laser beam $I_0$ irradiated on the data recording medium 21 at the data recording and reproducing area 7 is partly reflected at the interface $F_{13}$ and partly reflected at the interface $F_{34}$, respectively, and reflection beams $I_0'$ and $I_1$ are obtained. Where the laser beam $I_0$ is reflected at the interface $F_{34}$ to form the reflective laser beam $I_1$, its polarization plane is rotated by a Kerr rotation angle $\theta_k$. Accordingly, as shown in FIG. 15(b), a polarization plane of the reflection beam $I_1$ forms the Kerr rotation angle $\theta_k$ with respect to that of the incident laser beam $I_0$. More specifically to say, the polarization plane of the reflection beam $I_1$ has a y-directional component $I_{1y}$ which extends parallel to that of the incident beam $I_0$ and an x-directional component $I_{1x}$ which extends perpendicularly to that of the incident beam $I_0$. On the other hand, where the laser beam $I_0$ is reflected at the interface $F_{13}$ to form the reflective laser beam $I_0'$, its polarization plane is not rotated. Therefore, the polarization plane of the reflective beam $I_0'$ extends parallel to that of the incident beam $I_1$. In the case where the phase changing amount A satisfies the equation (5), where the reflective beam $I_0'$ meets the reflective beam $I_1$ to constitute a single reflective laser beam $I_1'$, the reflective beam $I_0'$ and the component $I_{1y}$ of the reflective beam $I_1$ undergo destructive interference. Accordingly, as shown in FIG. 15(c), a y-directional component $I_{1y}'$ of the composite reflective beam $I_1'$ has an intensity amount equal to a value obtained by subtracting an intensity amount $I_0'$ from an intensity amount $I_{1y}$, while an x-directional component $I_{1x}'$ has an intensity amount equal to an intensity amount $I_{1x}$. Since the intensity amount of $I_{1y}'$ of the composite reflective beam $I_1$ is thus smaller than that of $I_{1y}$ of the reflective beam $I_{1y}'$ an apparent Kerr rotation angle $\theta_k'$ of the composite reflective beam $I_1'$ becomes larger than the value $\theta_K$ of the real Kerr rotation angle $\theta_k$ of the reflective beam $I_1$. As apparent from the above description, an apparent Kerr rotation angle $\theta_k'$ is largely increased, in the case where the phase change amount A satisfies the equation (5).

In order to allow the phase changing amount A to satisfy the equation (5), the thickness $d_1$ of the interference layer 3 should satisfy the following equation (6), $$d_1 = \lambda/(4n_1) + m\lambda/(2n_1) \qquad (6)$$

where m is an integer.

Figure 16A:
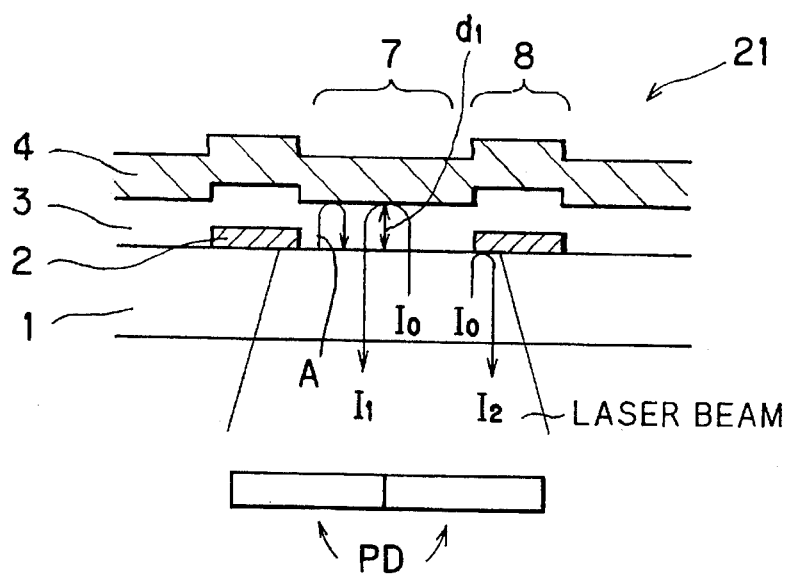
FIG. 16(a) schematically shows how the push-pull type tracking operation is achieved on the magnetooptic data recording medium of the present example.
Figure 16B:
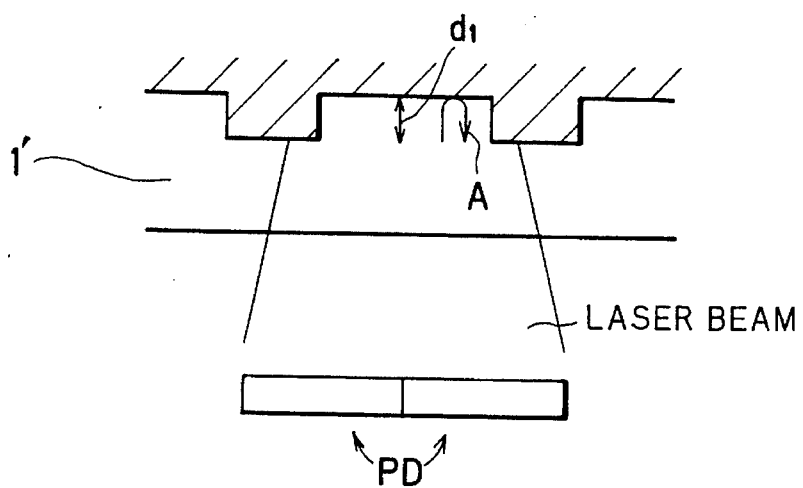
FIG. 16(b) schematically shows how the push-pull type tracking operation is achieved on a conventional data recording medium formed with the tracking guide grooves.
Figure 16C:
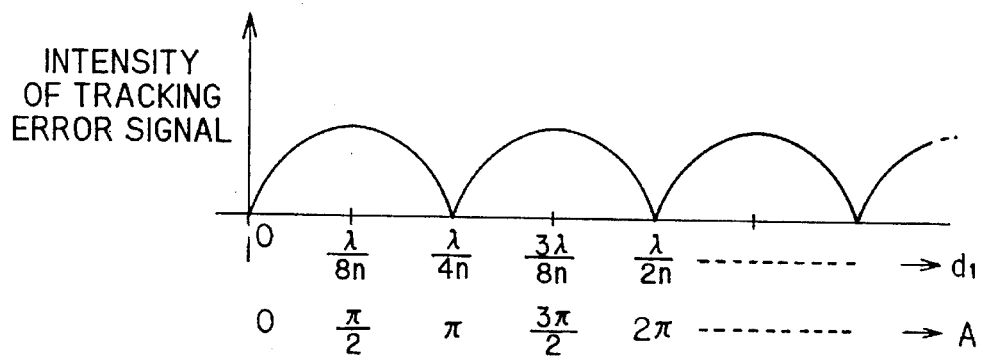
FIG. 16(c) is a graph showing the relationship between the groove depth of the conventional data recording medium with the tracking guide grooves and the magnitude of obtained tracking error signals.

On the other hand, a push-pull type tracking operation is applied for the data recording medium 21 of the present example. In the push-pull type tracking operation, laser beam is irradiated on the data recording medium so that the laser beam may be reflected and diffracted at the data recording and reproducing area 7 and the tracking guide area 8. A pair of photodetectors PD are provided for detecting intensities of the reflection beams from the data recording medium as illustrated in FIG. 16(a), and a differential signal representative of a difference value between the intensities detected by the pair of photodetectors is used as a tracking error signal. It is noted that how the laser beam is reflected and diffracted at the data recording medium 21 of the present example that is illustrated in FIG. 16(a) is the same as how laser beam is reflected and diffracted at a data recording medium of a pre-grooved type in which a tracking guide groove is formed in a substrate 1' that is illustrated in FIG. 16(b). In other words, the structure of the data recording medium 21 in which the interference layer 3 has a thickness of $d_1$ is equivalent to that of the pre-grooved type data recording medium in which the substrate 1' is formed with the tracking guide groove having a depth of $d_1$. As well known in the art, in the pre-grooved type data recording medium as shown in FIG. 16(b), the value of the tracking error signal periodically varies according to change of the groove depth $d_1$, as shown in FIG. 16(c). More specifically, the value of the tracking error signal is maximized in the case where the groove depth $d_1$ has a value of $\lambda/8n + m\lambda/4n$, and is minimized to have a value of zero (0) in the case where the groove depth $d_1$ has a value of $\lambda/4n + m\lambda/4n$, where n is an index of refraction of the substrate 1', m is an integer and $\lambda$ is a wavelength of the laser beam. Accordingly, the value of the tracking error signal obtained for the data recording medium 21 of the present example is maximized in the case where the interference layer thickness $d_1$ has a value of $\lambda/8n_1 + m\lambda/4n_1$, and is minimized to have a value of zero (0) in the case where the interference layer thickness $d_1$ has a value of $\lambda/4n_1 + m\lambda/4n_1$, where $n_1$ is an index of refraction of the interference layer 3, m is an integer and $\lambda$ is a wavelength of the laser beam. That is, the value of the tracking error signal is maximized in the case where the above-described phase changing amount A has a value of $\pi/2 + m\pi$, and is minimized to have a value of zero (0) in the case where the amount A has a value of $\pi + m\pi$. In other words, the tracking error signal has the maximum value and the zero value, in the case where a phase difference amount between a reflective beam $I_1$ reflected at the data recording and reproducing area 7 (that is, a reflective beam $I_1$ reflected from the data recording layer 4) and a reflective beam $I_2$ reflected at the tracking guide area 8 (that is, a reflective beam $I_8$ reflected from the reflective material 2) has values of $\pi/2 + m\pi$ and $\pi + m\pi$, respectively, as illustrated in FIG. 16(a).

As described above in great detail, therefore, in order to allow the tracking error signal to have the maximum value, the thickness $d_1$ of the interference layer 3 has to satisfy the following equation (7).

$$d_1 = \lambda/8n_1 + m\lambda/4n_1 \qquad (7)$$

On the other hand, in the case where the thickness $d_1$ of the interference layer 3 satisfies the following equation (8), the tracking error signal will have the minimum value (zero).

$$d_1 = \lambda/4n_1 + m\lambda/4n_1 \qquad (8)$$

As apparent from the equations (6) and (8), such a value of $d_1$ as satisfying the equation (6) always satisfies the equation (8). Accordingly, in order to perform the push-pull type tracking operation on the data recording medium 21 of the present example, the thickness $d_1$ of the interference layer 3 should be shifted from the value as satisfying the equation (6), so as to enable the tracking operation and therefore enable the data recording and reproducing operations.

According to the present invention, therefore, the value of the thickness $d_1$ of the interference layer 3 is selected to be within any of ranges between values satisfying the equation (6) and values satisfying the equation (7), i.e., in such ranges as enabling the tracking operation. Preferably, the thickness $d_1$ is set to be closer to the value satisfying the equation (6) than to the value satisfying the equation (7). In the case where the value of the thickness $d_1$ has a value which falls within any range between the values satisfying the equations (6) and (7) and which is closer to the value satisfying the equation (6), the thickness becomes relatively small with respect to that satisfying the equation (6), but is very close thereto. According to the present invention, therefore, the Kerr effect enhancement is not maximized, but is almost maximized, so that the C/N ratio of the data recording medium is greatly enhanced.

As apparent from the above description, according to the present invention, in order to largely increase the Kerr effect enhancement, the thickness $d_1$ of the interference layer 3 is selected to such a value as is close to a value satisfying the equation (6). Accordingly, the reflective beams $I_1$ and $I_0'$ as shown in FIG. 15(a) undergo the destructive interference, so that the reflectivity of the data recording and reproducing area 7 is decreased to be approximately minimized. In other words, the reflectivity of the data recording medium 21 is approximately minimized at its data recording and reproducing area 7, due to the interference phenomenon occurred in the interference layer 3. It is noted, however, that the reflectivity of the data recording medium is not decreased at all, at its tracking guide area 8 where the reflection material 2 remains. Accordingly, the data recording medium of the present invention prevents the value of the tracking error signal from being decreased, relative to the conventional data recording medium formed with the tracking guide grooves. According to the data recording medium of the present invention, therefore, it becomes possible to perform a stable tracking operation.

In the case where the preformat pits 6 are formed in the data recording medium 21 as shown in FIG. 14, furthermore, the thickness $d_1$ of the interference layer 3 should be selected so as to not only greatly increase the Kerr effect enhancement and allow the tracking error signal to have its approximately maximum value but also allow a reproducing signal for the preformat pit to have its approximately maximum value.

Figure 17:
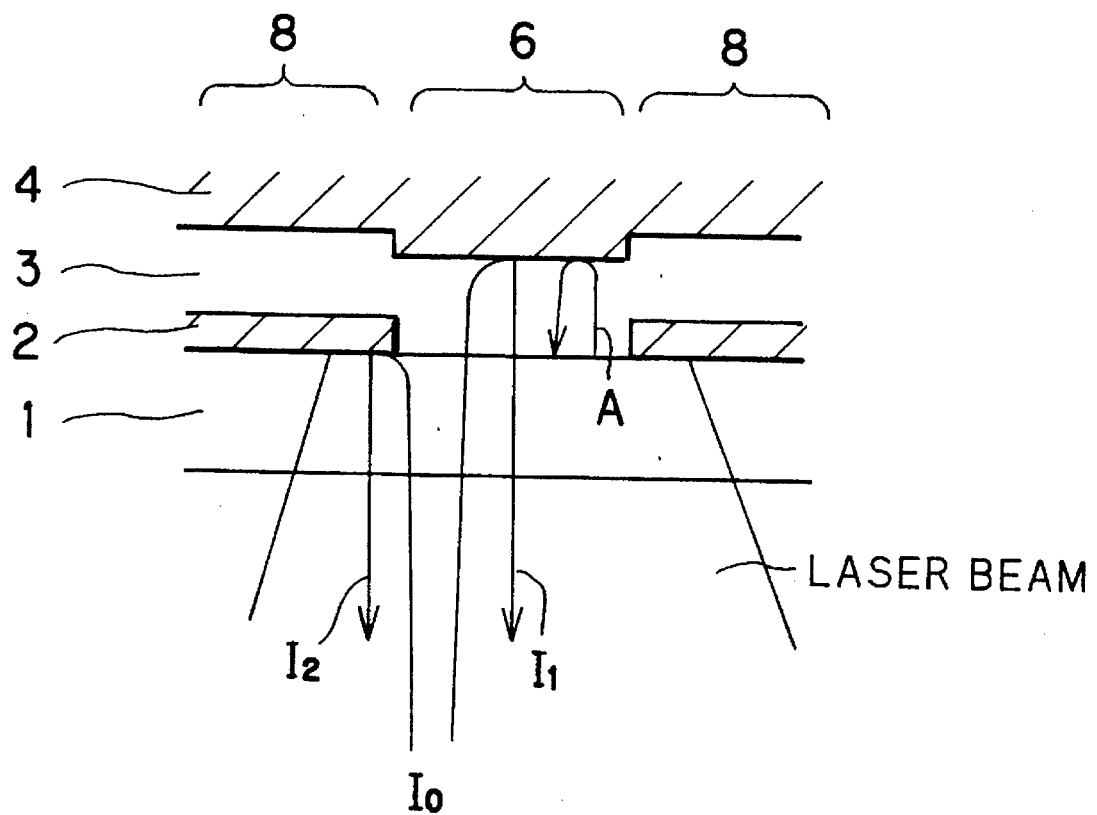
FIG. 17 schematically shows how the preformat pits of the magnetooptic data recording medium of the present example are reproduced.

It is noted that the value of the reproducing signal for the preformat pit 6 is maximized in the case where the thickness $d_1$ of the interference layer 3 satisfies the equation (6), for the following reason. In order to reproduce the preformat pit 6, laser beam is irradiated on the data recording medium 21, and intensity of laser beam reflected from the data recording medium is detected. At the time when the laser beam is irradiated on the data recording medium at the tracking guide area 8 but is not irradiated on any preformat pit 6, the laser beam is fully reflected at the reflection material layer 2. Intensity of the laser beam thus reflected from the reflection material layer 2 is detected as a reference level. In the case where the laser beam is irradiated on the preformat pit 6, on the other hand, as shown in FIG. 17, a part of the laser beam is reflected at the data recording layer 4 positioned at the preformat pit 6 to form a reflective beam $I_1$, and another part of the laser beam is reflected at the reflective material layer 2 positioned at the tracking guide area 8 which is positioned to surround the preformat pit 6 to thereby form another reflective beam $I_2$. In the case where the thickness $d_1$ of the interference layer 3 satisfies the equation (6), where the reflective beam $I_1$ meets the reflective beam $I_2$ to form a composite reflective beam, the reflective beams $I_1$ and $I_2$ undergo destructive interference, so that intensity of the composite reflection beam is minimized. Since a signal representative of a difference between the intensity of the composite reflection beam and the reference level is used as the preformat pit reproducing signal, the value of the preformat pit reproducing signal is maximized in the case where the thickness $d_1$ satisfies the equation (6).

However, in the case where the thickness satisfies the equation (6), as described already, the tracking error signal has the minimum value (zero value), and therefore it becomes impossible to perform the push-pull type tracking operation.

According to the present invention, therefore, in the case where the data recording medium is formed with the preformat pits 6, the thickness $d_1$ of the interference layer 3 is shifted from the value satisfying the equation (6) but satisfies the following equation (9), $$d_1 = [\lambda/4n_1 \pm \lambda/12n_1] + m\lambda/2n_1 \qquad (9).$$

In the case where the thickness $d_1$ thus satisfies the equation (9), the tracking error signal and the pit reproducing signal may have their proper values, and the Kerr effect enhancement is approximately maximized. Accordingly, excellent data recording and reproducing operations can be attained.

It is noted, however, that the thickness of the data recording layer 4 and the reflection material layer 2 should not be particularly limited.

Figure 18:
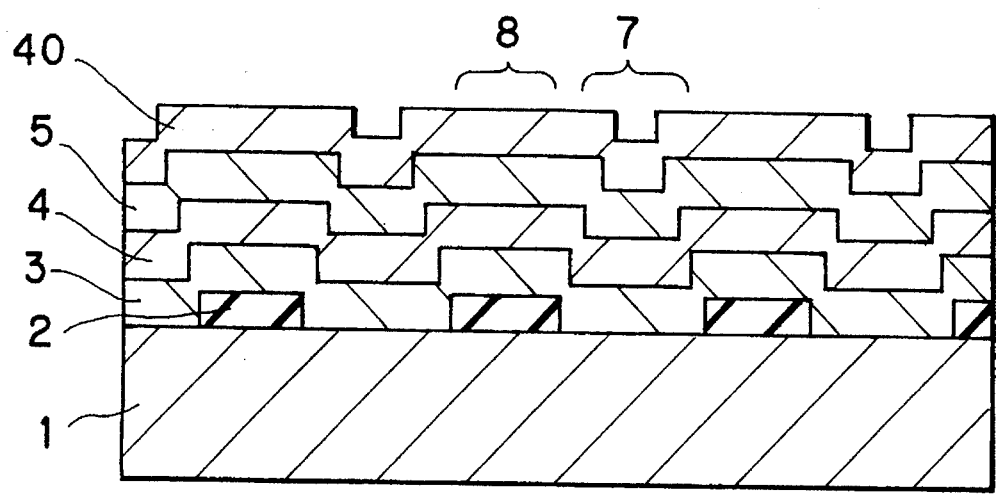
FIG. 18 is a cross-sectional side view of an essential part of a magnetooptic data recording medium of a modification of the example of the first preferred embodiment of the present invention.

For example, as shown in FIG. 18, the thickness of the data recording layer 4 may be selected to have a small value, and a reflection layer 40 may be provided on the protective layer 5. In this case, since the data recording layer 4 is thin, the laser beam irradiated on the substrate 1 can passes through the data recording layer 4 to be reflected at the reflection layer 40. The laser beam then again passes through the data recording layer 4. Thus, in this case, not only the Kerr effect but also Faraday effect occur at the data recording layer 4, so that the polarization plane of the laser beam is rotated by a rotation angle of a greater value. As a result, the C/N ratio of the data recording medium is considerably enhanced. In this case, since the reflectivity of the tracking guide area 8 can be prevented from being deteriorated similarly as described above, a stable tracking operation can be achieved.

Similarly, the thickness of the reflection material layer 2 may be selected to have a small value. In this case, height of stepped portions formed in the data recording layer 4 is decreased so that the data recording layer 4 may be made flattened. Accordingly, it is possible to prevent the data recording layer 4 from being deteriorated at its stepped portions.

It is noted that in the case where the thickness of the reflection material layer 2 is thus small, the laser beam irradiated on the data recording medium at the tracking guide area 8 on which the reflective material 2 remains is partly reflected at the reflective material, but partly passes through the reflective material. The part of the laser beam thus passing through the reflective material further travels through the interference layer 3 to be reflected at the data recording layer 4. Accordingly, in this case, the multiple reflection occurs in the interference layer 3 not only at its area corresponding to the data recording and reproducing area 7 from which the reflective material is removed but also at its area corresponding to the tracking guide area 8 where the reflective material remains. As a result, reflective laser beams are generated to be propagated in the interference layer 3 not only at its area corresponding to the data recording and reproducing area 7 but also at its area corresponding to the tracking guide area 8. Phase change amounts H occur in the respective laser beams as they travel from the substrate 1 toward the data recording layer 4, reflect at the data recording layer and return to the substrate have therefore various values. In other words, a plurality of laser beams outputted from the optical data recording medium have various values of phase difference amount therebetween. Accordingly, when the reflective laser beams meet one another to form a single composite reflective beam, they undergo various types of interference. However, in the case where a phase difference amount D between the phase change amount H occurring in a reflective laser beam traveling at the data recording and reproducing area 7 and a phase change amount H occurring in a reflective laser beam traveling at the tracking guide area 8 has a value approximately equal to $\pi/2+m\pi$(where m is an integer), the tracking error signal having the maximum value can be obtained. In other words, in the case where an amount of phase difference between a reflection beam reflected from the optical data recording medium at its area 7 from which the reflective material is removed and a reflection beam reflected from the optical data recording medium at its area 8 where the reflective, material remains has approximately a value of $\pi/2+m\pi$ where m is an integer, the tracking error signal having the maximum value can be obtained. Accordingly, in the present invention, the thickness of the respective layers should be preferably selected to such values as allowing the phase difference D to become approximately equal to the value of $\pi/2+m\pi$. Of course, the thickness of the layers may be shifted from the values allowing the phase difference D to become approximately equal to the value of $\pi/2+m\pi$. However, the thickness should not be selected to such values as allowing the phase difference D to become approximately equal to the value of $\pi+m\pi$, since the tracking error signal has a value of zero in the case where the phase difference D has a value approximately equal to the value of $\pi+m\pi$. Accordingly, the thickness should have such values as allowing an amount of phase difference between a reflection beam reflected from the optical data recording medium at its area 7 from which the reflective material is removed and a reflection beam reflected from the optical data recording medium at its area 8 where the reflective material remains to have a value other than $\pi+m\pi$ where m is an integer.

Similarly as described above, in the case where the data recording layer 4 is thin, a plurality of laser beams outputted from the optical data recording medium have various values of phase difference amount therebetween. Accordingly, when the reflective laser beams meet one another to form a single composite reflective beam, they undergo various types of interference. However, the thickness of the respective layers should not be selected to values allowing the phase difference D to become approximately equal to the value of $\pi+m\pi$, but should be preferably selected to such values as allowing the phase difference D to become approximately equal to the value of $\pi/2+m\pi$.

It should be further noted that in the case where a well-known three-beam tracking operation is achieved on the data recording medium of the present invention, the thickness $d_1$ of the interference layer 3 should have a value satisfying the above-described equation (6).

In the case where the data recording layer is formed of data recording material other than the magnetooptic material such as the phase-change material, the pit-formable material and the organic material, the thickness $d_1$ of the interference layer 3 should be selected so that the phase changing amount A of the laser beam may have a value approximately equal to $\pi+m(2\pi)$, where m is an integer, in order to enhance the data recording characteristics of the data recording medium.

A second preferred embodiment of the present invention will be described with reference to FIGS. 19 through 25.

Figure 19:
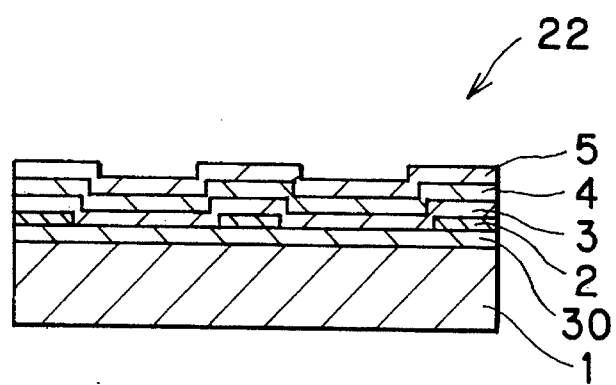
FIG. 19 is a cross-sectional side view of an essential part of an optical data recording medium of a second preferred embodiment of the present invention.

FIG. 19 illustrates an optical data recording medium 22 according to a second preferred embodiment of the present invention in which another interference layer 30 formed of transparent dielectric material (such as SiO, SiAlON, etc.) with its index of refraction being larger than that of the substrate 1 is provided under the reflective material layer 2. Accordingly, the reflective material layer 2 is sandwiched between the interference layers 3 and 30. The interference layer 30 can further enhance Kerr effect, to thereby further increase the C/N characteristics. The interference layer 30 will be referred to as a "first interference layer", and the interference layer 3 will be referred to as a "second interference layer", hereinafter.

The method of producing the data recording medium of the second embodiment is the same as that of the first embodiment, except that the first interference layer 30 having a predetermined thickness is first provided over the substrate 1 through a sputtering process or the like and then the reflective material layer 2 is formed over the first interference layer 30 thus formed on the substrate.

Figure 20:
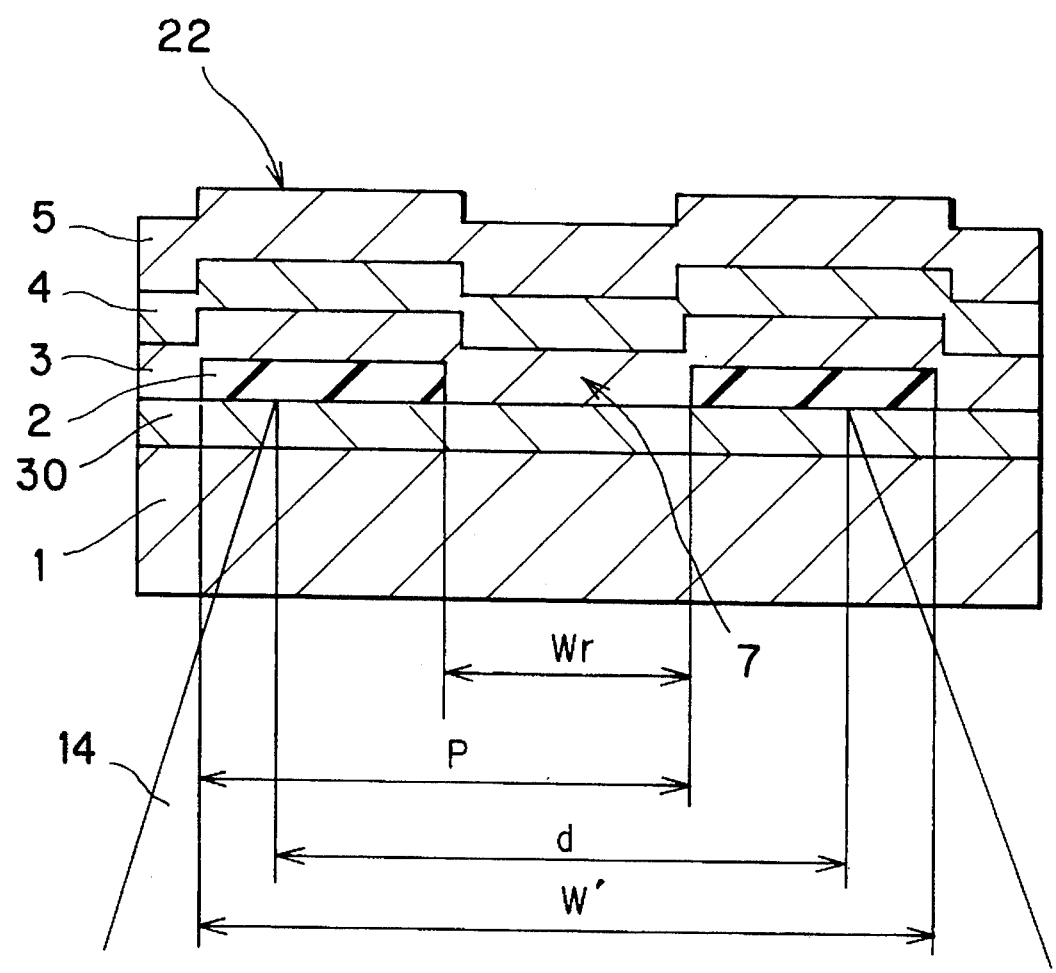
FIG. 20 illustrates the manner how the laser beam spot is irradiated on the data recording medium of the second embodiment to record data in the data recording layer thereof.

As shown in FIG. 20, similarly as in the optical data recording medium of the first embodiment, the data recording medium 22 of the present embodiment is designed so as to satisfy the already-described equation (3). Thus, it becomes possible to select the value of the track pitch P to be smaller than the laser beam spot diameter d while preventing the cross-talk from being increased. Accordingly, it is possible to narrow the track pitch of the data recording medium for enhancing the data recording density.

In the data recording medium of the second embodiment, similarly as in that of the first embodiment, thickness of the interference layers 3 and 30 are selected to such values as can enhance the C/N ratio without deteriorating the tracking servo performance. The thickness of the interference layers 3 and 30 will be described below in great detail with reference to an example of a magnetooptic data recording medium to which applied is the present embodiment.

Figure 21:
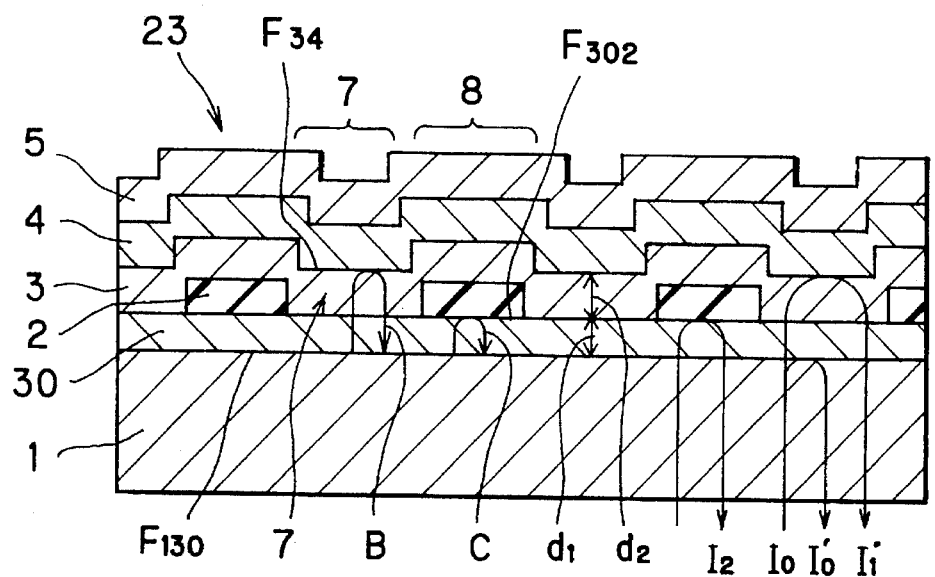
FIG. 21 is a cross-sectional side view of an essential part of a magnetooptic data recording medium of an example of the second preferred embodiment of the present invention.
Figure 22:
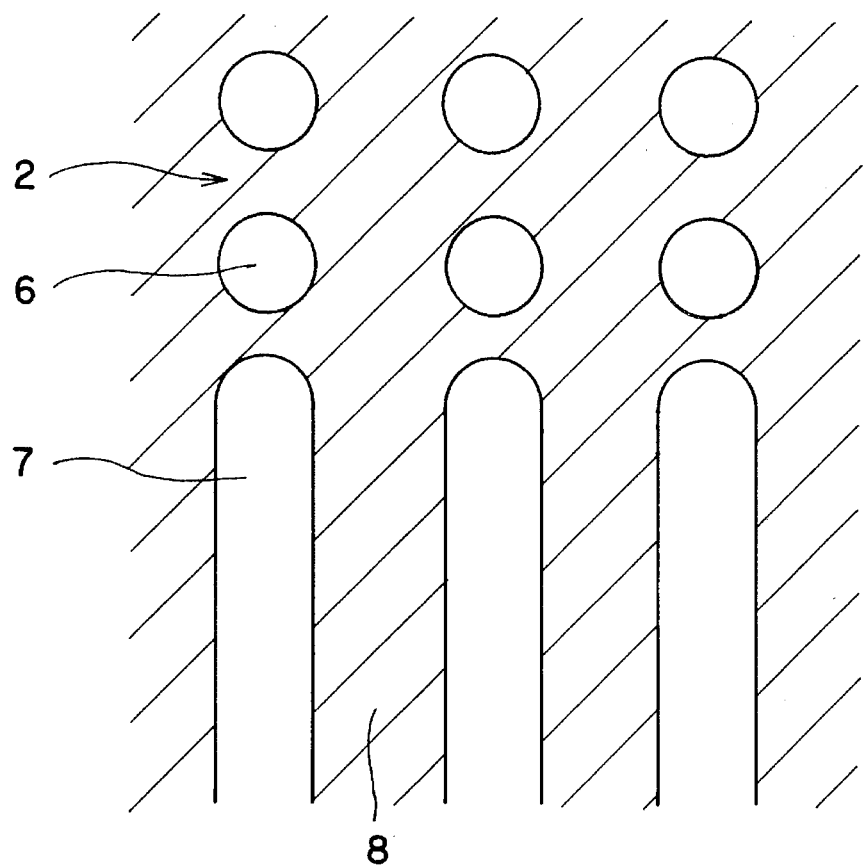
FIG. 22 illustrates the state how the light-reflective material of the reflective material layer of the magnetooptic data recording medium of FIG. 21 is partially removed from the magnetooptic data recording medium so as to form therein patterns of preformat pits and data recording and reproducing areas.

FIG. 21 shows a magnetooptic data recording medium 23 to which the present embodiment is applied. The data recording medium 23 therefore includes the substrate 1, the first interference layer 30, the reflective material layer 2, the second interference layer 3, the data recording layer 4 formed of the magnetooptic data recording material, and the protective layer 5. The structure of the magnetooptic data recording medium 23 is therefore the same as that of the already-described magnetooptic data recording medium 21 of the example of the first embodiment, except for the first interference layer 30. Also similarly as in the data recording medium 21, the reflective material in the reflective material layer 2 of the data recording medium 23 is partly removed from the first interference layer 30, as shown in FIG. 22, so that the data recording and reproducing areas 7, the preformat pits 6, and the tracking guide areas 8 are formed on the reflective material layer 2.

Similarly as in the data recording medium 21 of the first embodiment, as shown in FIG. 21, an incident laser beam $I_0$ irradiated on the data recording medium 23 at its data recording and reproducing area 7 for reproducing data recorded therein is partly reflected at an interface $F_{130}$ defined between the substrate 1 and the first interference layer 30 to form a reflection beam $I_0'$ and is partly reflected at an interface $F_{34}$ defined between the second interference layer 3 and the data recording layer 4 to form another reflection beam $I_1'$, since the first and second interference layers 30 and 3 are formed of the material which has an index of refraction of a high value. In other words, multiple reflection occurs both in the first and second interference layers 30 and 3. As indicated by an arrow B in FIG. 21, a phase change amount B which occurs in the laser beam as it travels through the interference layers 30 and 3 from the interface $F_{130}$ toward the interface $F_{34}$, reflects at the interface $F_{34}$ and returns to the interface $F_{130}$ satisfies the following equation (10), $$B = 2(2\pi/\lambda)(n_1'd_1' + n_2'd_2') \qquad (10),$$

where $d_1'$ and $d_2'$ represent thickness of the first and second interference layers 30 and 3, $n_1'$ and $n_2'$ represent the indices of refraction of the first and second interference layers 30 and 3, and $\lambda$ represents wavelength of the laser beam in vacuum space.

Especially in the case where the first and second interference layers 30 and 3 are formed of the same single material, the phase change amount B satisfies the following equation (11), $$B = 2n_f(2\pi/\lambda)(d_1' + d_2') \qquad (11)$$

where $n_f$ represents the indices of refraction of the first and second interference layers.

Similarly as in the data recording medium 21 of the first embodiment, in the case where the phase change amount B satisfies the following equation (12), the Kerr effect enhancement is maximized, so that the apparent Kerr rotation angle is obtained to be maximized to largely enhance the C/N ratio of the data recording medium 23.

$$B = \pi + 2m\pi \text{ (m is an integer)} \qquad (12).$$

As apparent from the equations (11) and (12), in the data recording medium 23 of the present example, in order to maximize the Kerr effect enhancement, the thickness $d_1'$ and $d_2'$ of the first and second interference layers 30 and 3 have to satisfy the following equation (13).

$$d_1' + d_2' = \lambda/4n_f + m\pi/2n_f \qquad (13)$$

In the data recording medium 23 of the present invention, therefore, the total thickness $(d_1' + d_2')$ of the first and second interference layers 30 and 3 is selected to have a value corresponding approximately to a quarter of a wavelength of the laser beam travelling in the layers 30 and 3 or a value corresponding approximately to a sum of the quarter of the wavelength and a value obtained by multiplying a half value of the wavelength by any integer. As a result, the Kerr effect enhancement is maximized, so that the C/N ratio of the data recording medium 22 is largely enhanced.

In order to obtain a push-pull type tracking error signal for the data recording medium 23, the laser beam is irradiated on the data recording medium. Similarly as in the data recording medium 21 of the first embodiment, in the case where a phase difference amount between a reflective laser beam $I_1$ reflected at the data recording and reproducing area 7 (that is, a reflective laser beam $I_1$ reflected from the data recording layer 4) and another reflective laser beam $I_2$ reflected at the tracking guide area 8 (that is, another reflective laser beam $I_2$ reflected from the reflective material 2) has a value approximately equal to $\pi/2+m\pi$ (where m is an integer), the tracking error signal is obtained to have its maximum value. In the case where the phase difference amount between the reflective laser beams $I_1$ and $I_2$ has a value approximately equal to $\pi+m\pi$, on the other hand, the tracking error signal is obtained to have its minimum value (zero value). The phase difference amount between the reflective laser beams $I_1$ and $I_2$ corresponds to a difference between the phase changing amount B occurring in the laser beam as it travels through both the interference layers 30 and 3 from the interface $F_{130}$ toward the interface $F_{34}$, reflects at the interface $F_{34}$, and returns to the interface $F_{130}$ and a phase changing amount C occurring in the laser beam as it travels through only the interference layer 30 from the interface $F_{130}$ toward an interface $F_{302}$ which is defined between the interference layer 30 and the reflective material layer 2, reflects at the interface $F_{302}$ and returns to the interface $F_{130}$, as shown in FIG. 21. The phase changing amount C therefore satisfies the following equation (14).

$$C=2n_I(2\pi/\lambda)d_1' \tag{14}$$

Accordingly, in order to allow the tracking error signal to have its maximum value, the following equation (15) has to be satisfied, $$B-C=\pi/2+k\pi \tag{15}$$

where k is an integer.

Thus, in order to not only maximize the Kerr effect enhancement but also maximize the amount of the tracking error signal, the thickness $d_1'$ and $d_2'$ of the interference layers 30 and 3 have to satisfy both the equations (12) and (15). Accordingly, the thickness $d_1'$ and $d_2'$ have to satisfy the following equations (16) and (17), $$d_1'=\lambda/8n_f+(2m-k)\lambda/4n_I \tag{16}$$

$$d_2'=\lambda/8n_f+k\lambda/4n_I \tag{17}$$

With the above-described structure, the reflectivity of the data recording and reproducing area 7 from which the reflective material is removed can be minimized, but the reflectivity of the tracking guide area 8 on which the reflective material remains is not decreased. It therefore becomes possible to prevent the tracking error signal from being deteriorated, contrary to the conventional data recording medium formed with the tracking guide grooves.

It is noted furthermore that in the case where the phase difference amount B–C satisfies the following equation (18), the tracking error signal has the minimum amount of 0, and therefore data recording and reproducing operation may not be achieved.

$$B-C=\pi+k\pi \tag{18}$$

In the case where the equation (18) is satisfied, the thickness $d_2'$ of the interference layer 3 satisfies the following equation (19) regardless of the value of the thickness $d_1$ of the interference layer 30, $$d_2'=\lambda/4n_f+k\lambda/4n_I \tag{19}$$

According to the present invention, therefore, the thickness $d_2'$ of the interference layer 3 should not be selected to such a value as satisfies the equation (19) so that the tracking error signal may have a value not equal to zero but the data recording and reproducing operation can be certainly achieved. Both in the case where the thickness $d_2'$ of the interference layer 3 is thus selected to a value which does not satisfy the equation (19) and in the case where the thickness $d_1'$ of the interference layer 30 is selected so that the selected values of $d_1'$ and $d_2'$ may satisfy the equation (13), the Kerr effect enhancement can be maximized to largely increase the C/N ratio while obtaining the tracking error signal proper to achieve a good tracking operation.

In addition, similarly as in the data recording medium 21 of the first embodiment, the reproducing signal of the preformat pits 6 has the maximum value, in the case where the phase difference amount B–C satisfies the following equation (20).

$$B-C=\pi+2k\pi \tag{20}$$

However, the thickness $d_2'$ of the interference layer 3 satisfying the equation (20) will always satisfy the equation (19). Accordingly, if the thickness $d_2'$ satisfies the equation (20), the tracking error signal will have a value of zero and the tracking operation may not be achieved. Accordingly, the thickness $d_2'$ should be shifted from the value satisfying the equation (19), but should be selected to satisfy the following equation (21) or (21').

$$d_2'=[\lambda/4n_f+\lambda/12n_I]+k\lambda/2n_I \tag{21}$$

$$d_2'=[\lambda/4n_f-\lambda/12n_I]+k\lambda/2n_I \tag{21'}$$

In the case where the $d_2$ satisfies the equation (21) or (21'), if the thickness $d_1'$ of the interference layer 30 satisfies the following equation (22) or (22'), the thickness values $d_1$ and $d_1$ satisfy the equation (13), so that the Kerr effect enhancement can be maximized.

$$d_1'=(m-k)\lambda/2n_f-\lambda/12n_I \tag{22}$$

$$d_1'=(m-k)\lambda/2n_f+\lambda/12n_I \tag{22'}$$

In the case where the thickness values $d_1'$ and $d_2'$ satisfy the equations (21) or (21') and (22) or (22'), therefore, the tracking error signal and the preformat pit reproducing signal may have sufficiently values, respectively, so that excellent data recording and reproducing operations can be achieved.

It is noted that the thickness of the data recording layer 4 and the reflection material layer 2 should not be particularly limited.

Figure 23:
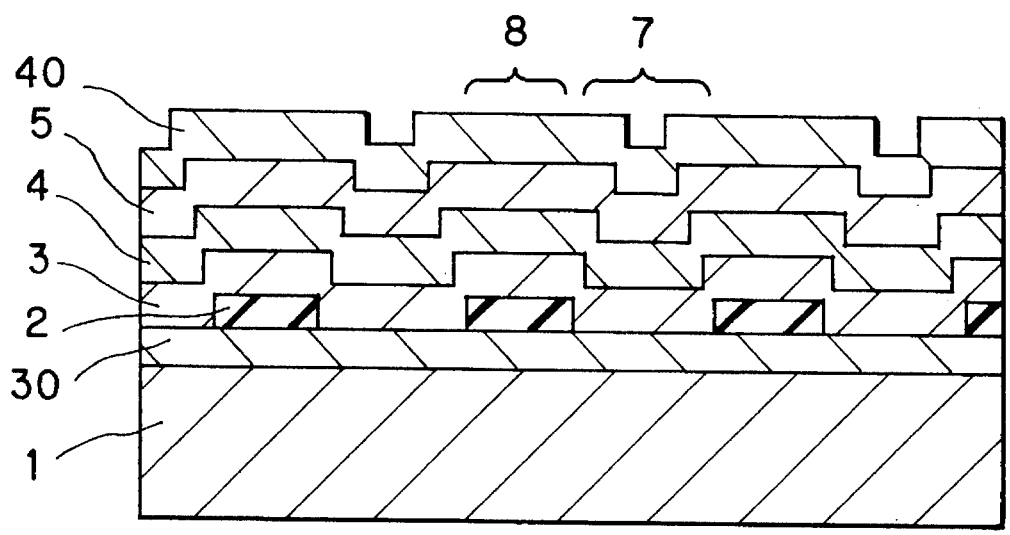
FIG. 23 is a cross-sectional side view of an essential part of a magnetooptic data recording medium of a modification of the example of the second preferred embodiment of the present invention.

For example, as shown in FIG. 23, the thickness of the data recording layer 4 may be selected to have a small value, and the reflection layer 40 may be provided on the protective layer 5, similarly as in the data recording medium 21 of the first embodiment shown in FIG. 18.

The thickness of the reflection material layer 2 may also be selected to have a small value, similarly as in the data recording medium 21 of the first embodiment. In the case where the reflection materiallayer 2 is thus thin, the laser beam irradiated on the data recording medium at the tracking guide area 8 on which the reflective material 2 remains is partly reflected at the reflective material, but partly passes through the reflective material. The part of the laser beam thus passing through the reflective material further travels through the interference layer 3 to be reflected at the data recording layer 4. Accordingly, in this case, the multiple reflection occurs in the interference layer 3 not only at its area corresponding to the data recording and reproducing area 7 from which the reflective material is removed but also at its area corresponding to the tracking guide area 8 where the reflective material remains. As a result, reflective laser beams are generated to be propagated in the interference layer 3 not only at its area corresponding to the data recording and reproducing area 7 but also at its area corresponding to the tracking guide area 8. Phase change amounts H occurred in the respective laser beams as they travel from the substrate 1 toward the data recording layer 4, reflect at the data recording layer and return to the substrate have therefore various values. In other words, a plurality of reflective laser beams outputted from the data recording medium have various values of phase difference amount therebetween. Accordingly, when the reflective laser beams meet with one another to form a single composite reflective beam, they undergo various types of interference. However, in the case where a phase difference amount D between the phase change amount H occurring in a reflective laser beam traveling at the data recording and reproducing area 7 and a phase change amount H occurring in a reflective laser beam traveling at the tracking guide area 8 has a value approximately equal to $\pi/2+m\pi$ (where m is an integer), the tracking error signal having the maximum value can be obtained. In other words, in the case where an amount of phase difference between a reflection beam reflected from the optical data recording medium at its area 7 from which the reflective material is removed and a reflection beam reflected from the optical data recording medium at its area 8 where the reflective material remains has approximately a value of $\pi/2+m\pi$ where m is an integer, the tracking error signal having the maximum value can be obtained. Accordingly, in the present invention, the thickness of the respective layers should be preferably selected to such values as allowing the phase difference D to become approximately equal to the value of $\pi/2+m\pi$. Of course, the thickness of the layers may be shifted from the values allowing the phase difference D to become approximately equal to the value of $\pi/2+m\pi$. However, the thickness should not be selected to values allowing the phase difference D to become approximately equal to the value of $\pi+m\pi$, since the tracking error signal has a value of zero in the case where the phase difference D has a value approximately equal to the value of $\pi+m\pi$. Accordingly, the thickness should have values allowing an amount of phase difference between a reflection beam reflected from the optical data recording medium at its area 7 from which the reflective material is removed and a reflection beam reflected from the optical data recording medium at its area 8 where the reflective material remains to have a value other than $\pi+m\pi$ where m is an integer.

Similarly as described above, in the case where the data recording layer 4 is thin, a plurality of laser beams outputted from the optical data recording medium have various values of phase difference amount therebetween. Accordingly, when the reflective laser beams meet one another to form a single composite reflective beam, they undergo various types of interference. However, the thickness of the respective layers should not be selected to values allowing the phase difference D to become approximately equal to the value of $\pi+m\pi$, but should be preferably selected to values allowing the phase difference D to become approximately equal to the value of $\pi/2+m\pi$.

It should be further noted that in the case where a well-known three-beam tracking operation is achieved on the data recording medium of the present invention, the thickness $d_1'$ and $d_2'$ of the interference layers should have a value satisfying the above-described equation (13).

In the case where the data recording layer is formed of data recording material other than the magnetooptic material such as the phase-change material, the pit-formable material and the organic material, the thickness $d_1'$ and $d_2'$ of the interference layers should be selected so that the phase changing amount B of the laser beam may have a value approximately equal to $\pi+m(2\pi)$, where m is an integer, in order to enhance the data recording characteristics of the data recording medium.

Figure 24:
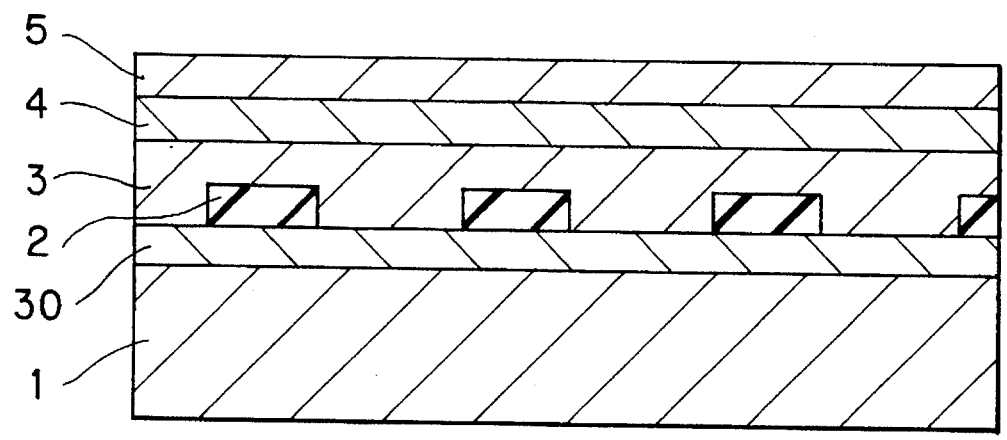
FIG. 24 is a cross-sectional side view of an essential part of a magnetooptic data recording medium of another modification of the example of the second preferred embodiment of the present invention.
Figure 25:
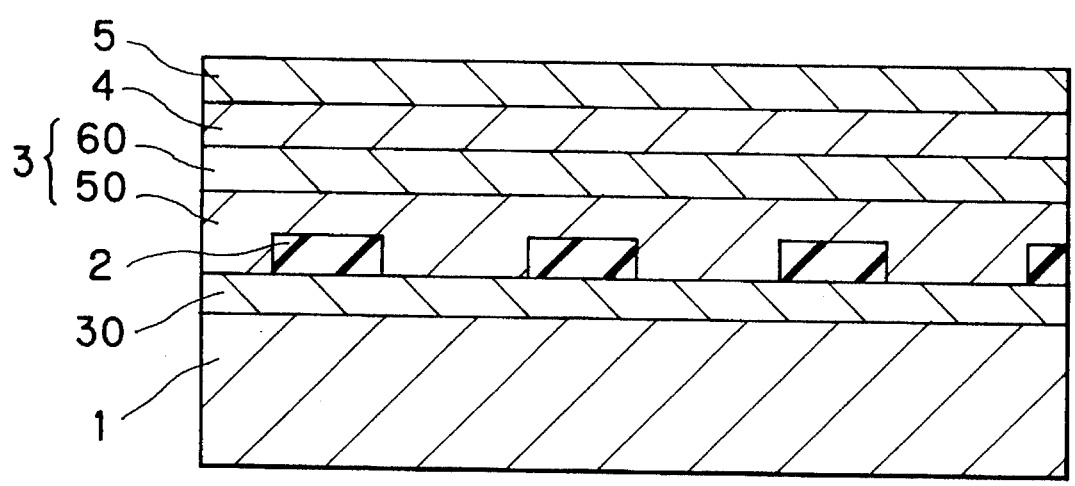
FIG. 25 is a cross-sectional side view of an essential part of a magnetooptic data recording medium of a further modification of the example of the second preferred embodiment of the present invention.

Additionally, the material of the interference layers 30 and 3 should not be particularly limited. The material of the interference layers 30 and 3 may not be the same with each other. The interference layers 30 and 3 may be formed of material different from each other. For example, as shown in FIG. 24, the interference layer 30 may be formed of SiAlON or the like, and the interference layer 3 may be formed of $TiO_2$, PLZT or the like formed through a spin coating method and a heat treatment. In this case, the data recording layer 4 may be made flattened. Furthermore, as shown in FIG. 25, the interference layer 3 may include a flattened layer 50 formed of $TiO_2$, PLZT or the like produced through a spin coating method and a dielectric film 60 formed of SiAlON or the like which is formed over the flattened layer 50 through a sputtering process or the like. To summarize, each of the interference layers 30 and 3 is unnecessarily formed of a single material, but may be formed of a multi-layered film formed of plural kinds of material.

Figure 26:
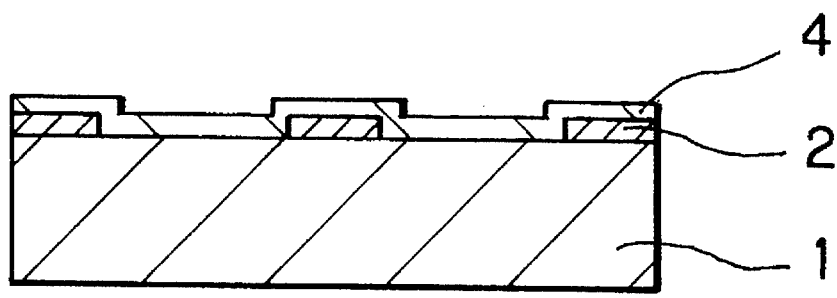
FIG. 26 is a cross-sectional side view of an essential part of an optical data recording medium of a third preferred embodiment of the present invention.

According to the data recording medium of the present invention, when the interference layers 3 and 30 are unnecessary, they may be eliminated from the data recording medium. FIG. 26 shows an optical data recording medium of a third preferred embodiment of the present invention in which the data recording layer 4 is provided over the reflective material layer 2 in such a manner that the data recording layer is in direct contact with the reflective material layer.

Figure 27:
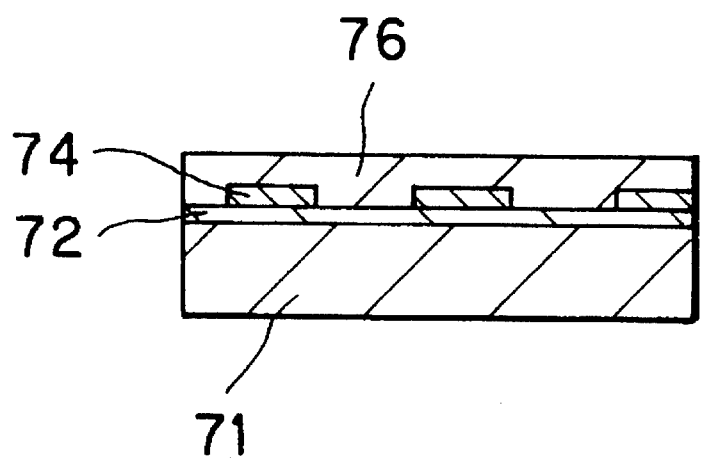
FIG. 27 is a cross-sectional side view of an essential part of an optical data recording medium of a fourth preferred embodiment of the present invention.

FIG. 27 illustrates an optical data recording medium according to a fourth preferred embodiment of the present invention in which an optical data recording layer 72 is provided over a substrate 71, and a reflective material layer 74 is provided over the data recording layer, and a protective layer 76 is provided over the reflective material layer. In order to perform data recording and data reproducing operations onto the data recording medium, a laser beam is irradiated on the data recording medium from its side opposite to the substrate.

As described above, in the optical data recording medium of the present invention, the reflective material layer provided on the substrate is patterned through partially removing the reflective material from the substrate. The patterned reflective material layer defines therein the preformat areas and the data recording and reproducing area. With this structure, the data recording medium enables high density data recordation without increasing cross-talk. In addition, since the data recording and reproducing area and the preformat pits are thus formed through simply removing the reflective material from the substrate, yield rate of the data recording medium is considerably enhanced. In addition, the mirror part can be formed through simply removing the reflective material completely from the substrate. The mirror part serves to provide the offset signal representative of the shift amount of an optical axis of the laser beam irradiated on the data recording medium and the inclination amount of the disk-shaped data recording medium. The offset signal will be used for neglecting the DC offset component of the tracking error signal.

In addition, since the interference layer is formed of material with its index of refraction being greater than that of the substrate, the Kerr effect enhancement is maximized, so that the apparent Kerr rotation angle is increased and therefore the C/N ratio of the data recording medium is considerably enhanced. Furthermore, since the value of the tracking error signal can be prevented from being deteriorated, it is possible perform a stable tracking operation.

While the present invention has been described in detail and with reference to specific embodiments thereof, it will be apparent to one skilled in the art that various changes and modifications can be made therein without departing from the spirit and scope thereof.

For example, the structures shown in FIGS. 18, 23 through 25 may be applied to not only the magnetooptic data recording medium but also to optical data recording medium of various types provided with the data recording layer formed of the phase-change material, the pit-formable material and the organic material, etc.

Figure 28:
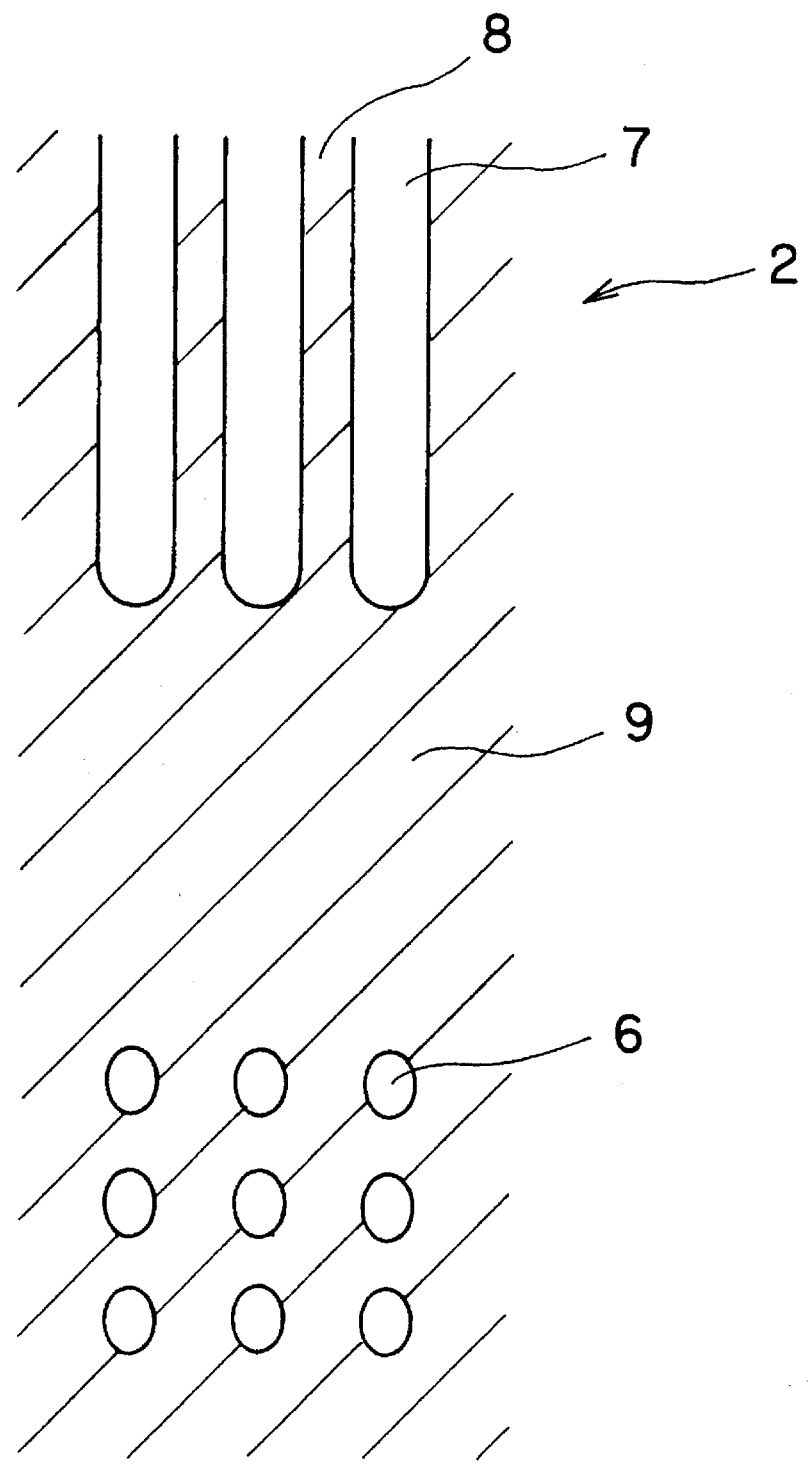
FIG. 28 is a sectional view of the reflective material layer of a modification of an optical data recording medium of the present invention.
Figure 29:
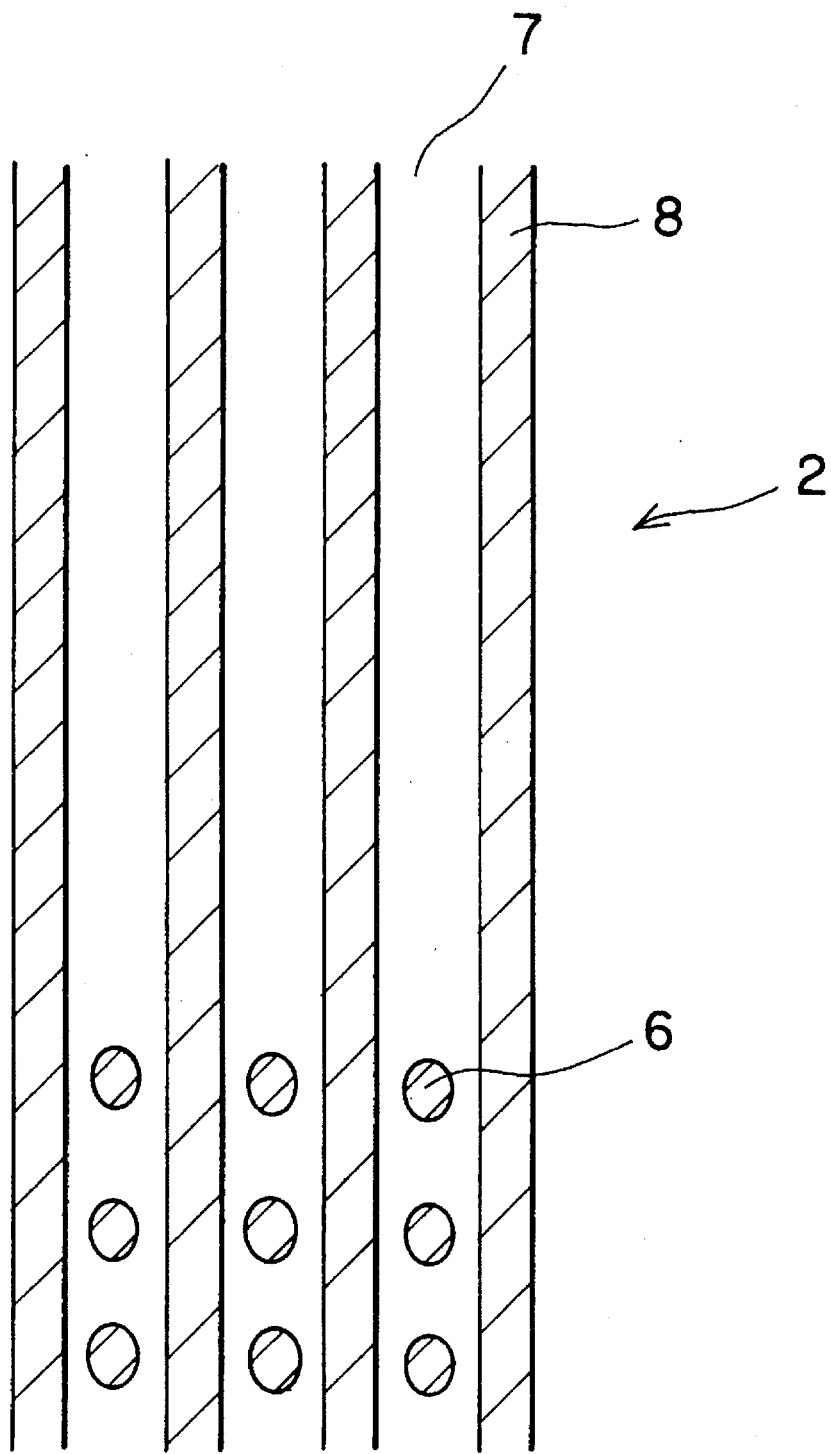
FIG. 29 is a sectional view of the reflective material layer of another modification of an optical data recording medium of the present invention.

Furthermore, as illustrated in FIG. 28, the mirror part 9 may be formed from an area on which the reflective material 2 completely remains. Similarly, as illustrated in FIG. 29, the preformat pit 6 may be formed from an area on which the reflective material 2 remains. Furthermore, though the data recording and reproducing area is formed to extend concentrically or spirally and the preformat pits are formed to be arranged concentrically or spirally in the above-described embodiments, the data recording and reproducing area may be formed to extend linearly and the preformat pits may be formed to be arranged linearly.

Furthermore, the reflective material layer 2 provided on the substrate 1 may be simply removed continuously in concentrical or spiral fashion so as to only form the data recording and reproducing areas 7 and the tracking guide film parts 8. In other words, the mirror parts 8 and the preformat pits 6 may not be formed on the reflective material layer through partly removing the reflective material therefrom. In such a case, the preformat signals may be recorded in the data recording layer 4.

In addition, a pair of protective layers may be provided on both sides of the data recording layer 4 so that the data recording layer may be sandwiched between the pair of protective layers.

Material of the interference layer, the protective layer and the substrate should not be particularly limited. Material and a reflection factor of the reflective material layer 2 should not be particularly limited. The reflective material layer may be formed of material with its light absorption having a large value. Material of the interference layer is required to have a value of an index of refraction higher than that of the substrate, but is not particularly limited. For example, the interference layer may be formed of a multi-layered film made of a plurality of materials.

What is claimed is:

1. An optical data recording medium for optically recording data therein and for optically reproducing the data therefrom, both done using a laser beam, said optical data recording medium comprising:

a substrate;

a patterned reflective material layer provided over said substrate, and patterned to include reflective portions formed of a light-reflective material and transmissive portions, the transmissive portions formed by complete removal of the light-reflective material, said transmissive portions defining data recording and reproducing areas, the light-reflective material reflecting at least a part of the laser beam that falls thereon;

an interference layer provided over both the reflective portions and the transmissive portions of said patterned reflective material layer, a surface of the interference layer remote from said patterned reflective material layer having raised portions corresponding to said reflective portions, said interference layer being formed of a dielectric material having an index of refraction larger than that of said substrate; and an optical data recording layer provided over said interference layer for optically recording data therein and for optically reproducing the data thus recorded therein, wherein said data recording and reproducing areas of said patterned reflective material layer are continuously extended to define a plurality of side-by-side data recording tracks, the transmissive portions of said data recording tracks allowing the laser beam irradiated on said substrate to pass therethrough to reach said optical data recording layer, thereby recording data in said optical data recording layer and reproducing the data recorded in said optical data recording layer, said reflective portions of said patterned reflective material layer defining tracking guide areas between adjacent data recording tracks, the data recording and reproducing areas and the tracking guide areas having their widths extending perpendicular to a data recording track extending direction, a total value of the width of one of said data recording and reproducing areas and the widths of the tracking guide areas located on each longitudinal side of said one data recording and reproducing area being equal to or greater than a spot diameter of the laser beam to be irradiated on said optical data recording layer.

2. The optical data recording medium as claimed in claim 1, wherein said patterned reflective material layer is patterned by removing portions of the light-reflective material from said patterned reflective material layer in accordance with preformat information so that the transmissive portions are discontinuously arranged along the data recording tracks to define preformat areas adapted for receiving and passing a laser beam irradiated on said substrate to said optical data recording layer for optically modulating the reflected light beam in accordance with the preformat information.

3. The optical data recording medium as claimed in claim 1, wherein said patterned reflective material layer has light-reflective material completely removed from the width of the data recording tracking guide area along a preselected length parallel to the track extending direction, thereby defining a mirror part.

4. The optical data recording medium as claimed in claim 1, wherein said interference layer provided over said patterned reflective material layer is a first interference layer, and further comprising a second interference layer formed of dielectric material, said second interference layer being provided between said substrate and said patterned reflective material layer.

5. The optical data recording medium as claimed in claim 1, wherein said interference layer has a thickness of approximately $\lambda/(4n)+m\lambda/(2n)$ where n is the index of refraction, $\lambda$ is a wavelength in vacuum space of the laser beam to be irradiated on said optical data recording medium for reproduction of data recorded in said optical data recording layer and for three beam tracking operation, and m is an integer.

6. The optical data recording medium as claimed in claim 1, wherein said interference layer has a thickness falling within a range between a first value of $\lambda/(4n)+m\lambda/(2n)$ and a second value of $\lambda/(8n)+m\lambda/4n$ where n is the index of refraction, $\lambda$ is a wavelength in vacuum space of the laser beam to be irradiated on said optical data recording medium for reproduction of data recorded in said optical data recording layer and for a push-pull tracking operation, and m is an integer.

7. The optical data recording medium as claimed in claim 1, wherein said reflective material layer is patterned by removing portions of the light-reflective material from said reflective material layer in accordance with preformat information so that transmissive portions are discontinuously arranged along the data recording tracks to define preformat areas adapted for receiving and reflecting the laser beam irradiated on said substrate and for optically modulating the reflected laser beam in accordance with the preformat information, the preformat areas being formed to be arranged to define a plurality of data recording tracks, and wherein said interference layer has a thickness of approximately $(\lambda/(4n)+\lambda/12n)+m\lambda/2n$ where n is the index of refraction, $\lambda$ is a wavelength in vacuum space of the laser beam to be irradiated on said optical data recording medium for reproduction of data recorded in said optical data recording layer, for a push-pull tracking operation, and for reproduction of the preformat area, and m is an integer.

8. The optical data recording medium as claimed in claim 1, wherein said interference layer has a thickness that allows a phase change amount approximate value of $\pi+m(2\pi)$ where m is an integer, said phase change occurring in the laser beam as the laser beam travels through said interference layer from a fourth interface defined between said substrate and said interference layer toward a fifth interface defined between said interference layer and said optical data recording layer, returns at the fifth interface to travel again through said interference layer and reaches the fourth interface.

9. The optical data recording medium as claimed in claim 1, wherein an amount of phase difference between a reflection beam reflected from said optical data recording medium at an area from which the light-reflective material is removed and a reflection beam reflected from said optical data recording medium at area where the light-reflective material remains has an a value other than approximately $\pi+m\pi$ where m is an integer.

10. The optical data recording medium as claimed in claim 1, wherein the substrate has a flattened surface, and wherein each of said reflective portions of said patterned reflective material layer formed on the flattened surface is of a band shape having a first thickness, said interference layer provided over said patterned reflective material layer being corrugated to form band-shaped raised portions of a height approximately equal to the first thickness.

11. The optical data recording medium as claimed in claim 1, wherein said interference layer has a uniform thickness and wherein said raised portions on said surface remote from said patterned reflective material layer are located at positions corresponding to said reflective portions.

12. The optical data recording medium as claimed in claim 1, wherein said optical data recording layer provided over said interference layer has a surface remote from said interference layer, the surface having raised portions corresponding to the raised portions of said interference layer.

13. The optical data recording medium as claimed in claim 2, wherein the preformat areas are formed to be arranged to define a aplurality of data recording tracks.

14. The optical data recording medium as claimed in claim 4, wherein the index of refraction of said second interference layer has a value larger than that of said substrate.

15. The optical data recording medium as claimed in claim 4, wherein said first interference layer and said second interference layer have thicknesses that allow a phase change amount approximately of $\pi+m(2\pi)$ where m is an integer, said phase change occurring in the laser beam as the laser beam travels through said first and second interference layers from a second interface defined between said substrate and said first interference layer toward a first interface defined between said second interference layer and said optical data recording layer, returns at the second interface to travel again through said first and second interference layers and reaches the first interface.

16. The optical data recording medium as claimed in claim 4, wherein an amount of phase difference between a reflection beam reflected from said optical data recording medium at an area from which the light-reflective material is removed and a reflection beam reflected from said optical data recording medium at an area where the light-reflective material remains has a value other than $\pi+m\pi$ where m at an integer.

17. The optical data recording medium as claimed in claim 4, wherein an amount of phase difference between a reflection beam reflected from said optical data recording medium at an area from which the light-reflective material is removed and a reflection beam reflected from said optical data recording medium at an area where the light-reflective material remains has a value of approximately $\pi/2+m\pi$ where m is an integer.

18. The optical data recording medium as claimed in claim 4, wherein a thickness of said first interference layer is approximately $(\lambda/4n_2 \pm \lambda/12n_2 + m\lambda/2n_2)$ where $n_2$ represents the index of refraction of said second interference layer, $\lambda$ represents a wavelength, in a vacuum space, of the laser beam to be irradiated on said optical data recording medium and m represents an integer.

19. The optical data recording medium as claimed in claim 6, wherein the thickness of said interference layer has a value closer to the first value than to the second value.

20. The optical data recording medium as claimed in claim 9, wherein the amount of phase difference has approximately value of $\pi/2+m\pi$ where m is an integer.

21. The optical data recording medium as claimed in claim 13, wherein area and the preformat have their widths extending perpendicularly to the data recording track extending direction, the width of the data recording and reproducing areas having a value equal to or larger than that of the preformat area.

22. The optical data recording medium as claimed in claim 14, wherein indices of refraction of said first and second interference layers are equal to each other.

23. The optical data recording medium as claimed in claim 15, wherein said phase change occurring in laser beam as the laser beam travels through said first and second interference layers is a first phase change amount and wherein the thickness of said first interference layer and the thickness of said second interference layer have values allowing a difference amount of approximately $\Pi/2+m\Pi$, where m is an integer, between said first phase change amount and a second phase change amount occurring in the laser beam as the laser beam travels through said second interference layer from the first interface toward a third interface defined between said second interference layer and said reflective material layer, reflects at the third interface to travel again through said second interference layer and returns to the first interface.

24. The optical data recording medium as claimed in claim 16, wherein a difference amount of other than approximately $\pi+m\pi$, where m is an integer, exists between a first phase change amount occurring in the laser beam as the laser beam travels through said first and second interference layers from a first interface defined between said substrate and said second interference layer toward a second interface defined between said first interference layer and said optical data recording layer, reflects at the second interface to travel again through said first and second interference layers and returns to the first interface and a second phase change amount occurring in laser beam as the laser beam travels through said second interference layer from the first interface toward a third interface defined between said second interference layer and the light-reflective material remaining on said second interference layer, reflects at the third interface to travel again through said second interference layer and returns to the first interface.

25. The optical data recording medium as claimed in claim 17, wherein a difference of approximately $\pi/2+m\pi$, where m is an integer, exists between a first phase change amount occurring in the laser beam as the laser beam travels through said first and second interference layers from a first interface defined between said substrate and said second interference layer toward a second interface defined between said first interference layer and said optical data recording layer, reflects at the second interface to travel again through said first and second interference layers and returns to the first interface and a second phase change amount occurring in the laser beam as the laser beam travels through said second interference layer from the first interface toward a third interface defined between said second interference layer and the light-reflective material remaining on said second interference layer, reflects at the third interface to travel again through said second interference layer and returns to the first interface.

26. The optical data recording medium as claimed in claim 21, wherein a total value of the width of a preformat area and the widths of the adjacent tracking guide areas positioned on opposite sides of the preformat area is equal to or greater than the spot diameter of the laser beam irradiated on said data recording layer.

27. The optical data recording medium as claimed in claim 21, wherein said substrate is a disk, wherein a track pitch comprises a distance between each two adjacent data recording tracks, and wherein the width of the data recording and reproducing areas and the track pitch decreases away from the center toward the outer periphery of the substrate.

28. The optical data recording medium as claimed in claim 22, wherein a total thickness of a thickness of said second interference layer and a thickness of said first interference layer has a value of approximately $\lambda/4n+m\lambda/2n$ where n represents the index of refraction of said first and second interference layers, $\lambda$ represents a wavelength in a vacuum space of laser beam to be irradiated on said optical data recording medium for reproduction of data recorded in said optical data recording layer, and m is an integer.

29. The optical data recording medium as claimed in claim 28, wherein a thickness of said first interference layer has value other than a value approximately $\lambda/4n+k\lambda/4n$ where n represents the index of refraction of said first and second interference layers, $\lambda$ represents a wavelength in a vacuum space of the laser beam to be irradiated on said optical data recording medium for reproduction of data recorded in said optical data recording layer and for a push-pull tracking operation, and m and k are integers.

30. The optical data recording medium as claimed in claim 29, wherein a thickness of said second interference layer has value of approximately $\lambda/8n+(2m-k)\lambda/4n$ and a thickness of said first interference layer has a value represented of approximately $\lambda/8n+k\lambda/4n$ where n represents the index of refraction of said first and second interference layers, $\lambda$ represents a wavelength in a vacuum space of the laser beam to be irradiated on said optical data recording medium for reproduction of data recorded in said optical data recording layer and for a push-pull tracking operation, and m and k are integers.

31. The optical data recording medium as claimed in claim 29, wherein said reflective material layer is patterned by removing portions of the light-reflective material from said reflective material layer in accordance with preformat information so that transmissive portions are discontinuously arranged along the data recording tracks to define preformat areas adapted for receiving and reflecting the laser beam irradiated on said substrate and for optically modulating the reflected laser beam in accordance with the preformat information, the preformat areas being formed to be arranged to define a plurality of data recording tracks.

32. The optical data recording medium as claimed in claim 31, wherein a thickness of said first interference layer has a value of approximately $(\lambda/(4n)+\lambda/12n)+k\lambda/2n$ and a thickness of approixmately said second interference layer has a value of $(m-k)\lambda/2n-\lambda/12n$ where n is the index of refraction of the first and second interference layers, $\lambda$ is a wavelength in vacuum space of the laser beam to be irradiated on said optical data recording medium for reproduction of data recorded in said optical data recording layer, for a push-pull tracking operation, and for reproduction of the preformat area, and m and k are integers.

33. The optical data recording medium as claimed in claim 31, wherein a thickness of said first interference layer has a value, of approximately $(\lambda/(4n)-\lambda/12n)+k\lambda/2n$ and a thickness of said second interference layer has a value of approximately $(m-k)\lambda/2n+\lambda/12n$ where n is the index of refraction of the first and second interference layers, $\lambda$ is a wavelength in vacuum space of the laser beam to be irradiated on said optical data recording medium for reproduction of data recorded in said optical data recording layer, for a push-pull tracking operation, and for reproduction of the preformat area, and m and k are integers.

\* \* \* \* \*